United States Patent
Wang et al.

(10) Patent No.: US 12,313,758 B2
(45) Date of Patent: May 27, 2025

(54) POSITIONING METHOD, TERMINAL, AND NETWORK DEVICE

(71) Applicant: VIVO MOBILE COMMUNICATION CO., LTD., Guangdong (CN)

(72) Inventors: Yuanyuan Wang, Guangdong (CN); Ye Si, Guangdong (CN); Peng Sun, Guangdong (CN); Zichao Ji, Guangdong (CN); Huaming Wu, Guangdong (CN); Zixun Zhuang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 364 days.

(21) Appl. No.: 17/869,175

(22) Filed: Jul. 20, 2022

(65) Prior Publication Data
US 2022/0357418 A1 Nov. 10, 2022

Related U.S. Application Data

(63) Continuation of application No. PCT/CN2021/074997, filed on Feb. 3, 2021.

(30) Foreign Application Priority Data

Feb. 5, 2020 (CN) .......................... 202010081014.6

(51) Int. Cl.
*G01S 5/00* (2006.01)
*G01S 5/02* (2010.01)
(Continued)

(52) U.S. Cl.
CPC .......... *G01S 5/0063* (2013.01); *G01S 5/0236* (2013.01); *H04L 5/0051* (2013.01); *H04W 24/10* (2013.01)

(58) Field of Classification Search
CPC ... G01S 5/0063; G01S 5/0236; H04L 5/0048; H04L 5/0051; H04L 5/0069;
(Continued)

(56) References Cited

U.S. PATENT DOCUMENTS 5,852,630 A * 12/1998 Langberg ............ H04L 27/2647
375/219
2012/0083278 A1 4/2012 Kazmi et al.
(Continued)

FOREIGN PATENT DOCUMENTS

CN 1984472 A 6/2007
CN 102340734 A 2/2012
(Continued)

OTHER PUBLICATIONS

Qualcomm Inc., "Stage 2 for Multi-RTT positioning", 3GPP TSG-RAN WG2 Meeting #108, R2-1915558, Reno, Nevada, USA, Nov. 18-22, 2019.

*Primary Examiner* — Siu M Lee
(74) *Attorney, Agent, or Firm* — Price Heneveld LLP

(57) ABSTRACT

The present invention relates to the field of communications technologies, and provides a positioning method, a terminal, and a network device. The positioning method includes: obtaining positioning information, where the positioning information includes priority information related to a positioning signal, and/or measurement time information of a positioning signal; and determining the positioning signal based on the positioning information.

20 Claims, 7 Drawing Sheets

(51) Int. Cl.
*H04L 5/00* (2006.01)
*H04W 24/10* (2009.01)

(58) Field of Classification Search
CPC .... H04L 5/0091; H04W 24/08; H04W 24/10; H04W 4/02; H04W 4/025; H04W 64/00
See application file for complete search history.

(56) References Cited

U.S. PATENT DOCUMENTS

| | | |
|---|---|---|
| 2013/0021428 A1 | 1/2013 | Byers et al. |
| 2015/0148063 A1 | 5/2015 | Jung et al. |
| 2016/0154117 A1 | 6/2016 | Baudia |
| 2017/0048662 A1* | 2/2017 | Yoshida ............... H04W 4/029 |
| 2020/0367022 A1* | 11/2020 | Tenny .................. H04W 4/029 |
| 2021/0385618 A1* | 12/2021 | Modarres Razavi ....................... G01S 5/0236 |
| 2022/0174641 A1* | 6/2022 | Cha ......................... H04L 5/005 |
| 2023/0047727 A1* | 2/2023 | Si .......................... H04W 52/02 |

FOREIGN PATENT DOCUMENTS

| | | |
|---|---|---|
| CN | 103200610 A | 7/2013 |
| CN | 104980888 A | 10/2015 |
| CN | 106154301 A | 11/2016 |
| CN | 108574984 A | 9/2018 |
| CN | 110351828 A | 10/2019 |
| JP | 2014502067 A | 1/2014 |
| JP | 2016057071 A | 4/2016 |
| JP | 2016533068 A | 10/2016 |
| KR | 20150022760 A | 3/2015 |
| WO | 2015149581 A1 | 10/2015 |
| WO | WO-2018202070 A1 * | 11/2018 ........... G01S 5/0236 |
| WO | 2019027245 A1 | 2/2019 |

\* cited by examiner

POSITIONING METHOD, TERMINAL, AND NETWORK DEVICE

CROSS-REFERENCE TO RELATED APPLICATIONS

This application is a continuation application of PCT International Application No. PCT/CN2021/074997 filed on Feb. 3, 2021, which claims priority to Chinese Patent Application No. 202010081014.6, filed in China on Feb. 5, 2020, which are incorporated in their entireties by reference herein.

TECHNICAL FIELD

The present invention relates to the field of communications technologies, and in particular, to a positioning method, a terminal, and a network device.

BACKGROUND

An important field in mobile communication is location and positioning technologies. With development of mobile communications technologies, higher requirements are posed on terminal location services, such as high accuracy and a low delay. In an existing positioning method, a mobile terminal reports relevant information of a serving cell and neighboring cells to a positioning server, and the positioning server obtains location information of the terminal based on the reported information. However, in a positioning process, it is difficult to satisfy a requirement for a low positioning delay due to impact of a factor such as a signal measurement, an information reporting time, or a reporting resource, for example, because a resource of a positioning signal is occupied by another service.

SUMMARY

According to a first aspect, an embodiment of the present invention provides a positioning method, applied to a terminal and including:
  obtaining positioning information, where the positioning information includes priority information related to a positioning signal, and/or measurement time information of a positioning signal; and
  determining the positioning signal based on the positioning information.

According to a second aspect, an embodiment of the present invention further provides a positioning method, applied to a network device and including:
  determining positioning information, where the positioning information includes priority information related to a positioning signal, and/or measurement time information of a positioning signal; and
  sending the positioning information to a terminal.

According to a third aspect, an embodiment of the present invention further provides a terminal, including:
  a first obtaining module, configured to obtain positioning information, where the positioning information includes priority information related to a positioning signal, and/or measurement time information of a positioning signal; and
  a first determining module, configured to determine the positioning signal based on the positioning information.

According to a fourth aspect, an embodiment of the present invention further provides a network device, including:
  a second determining module, configured to determine positioning information, where the positioning information includes priority information related to a positioning signal, and/or measurement time information of a positioning signal; and
  a first sending module, configured to send the positioning information to a terminal.

According to a fifth aspect, an embodiment of the present invention further provides a terminal, including a memory, a processor, and a computer program stored in the memory and capable of running on the processor, where when the computer program is executed by the processor, steps of the foregoing positioning method are implemented.

According to a sixth aspect, an embodiment of the present invention further provides a network device, including a memory, a processor, and a computer program stored in the memory and capable of running on the processor, where when the computer program is executed by the processor, steps of the foregoing positioning method are implemented.

According to a seventh aspect, an embodiment of the present invention further provides a computer-readable storage medium, where the computer-readable storage medium stores a computer program, and when being executed by a processor, the computer program implements steps of the foregoing positioning method.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings.

DESCRIPTION OF EMBODIMENTS

To make the objectives, technical solutions, and advantages of the present invention clearer, the following describes the present invention detail with reference to the drawings and specific embodiments.

Figure 1:
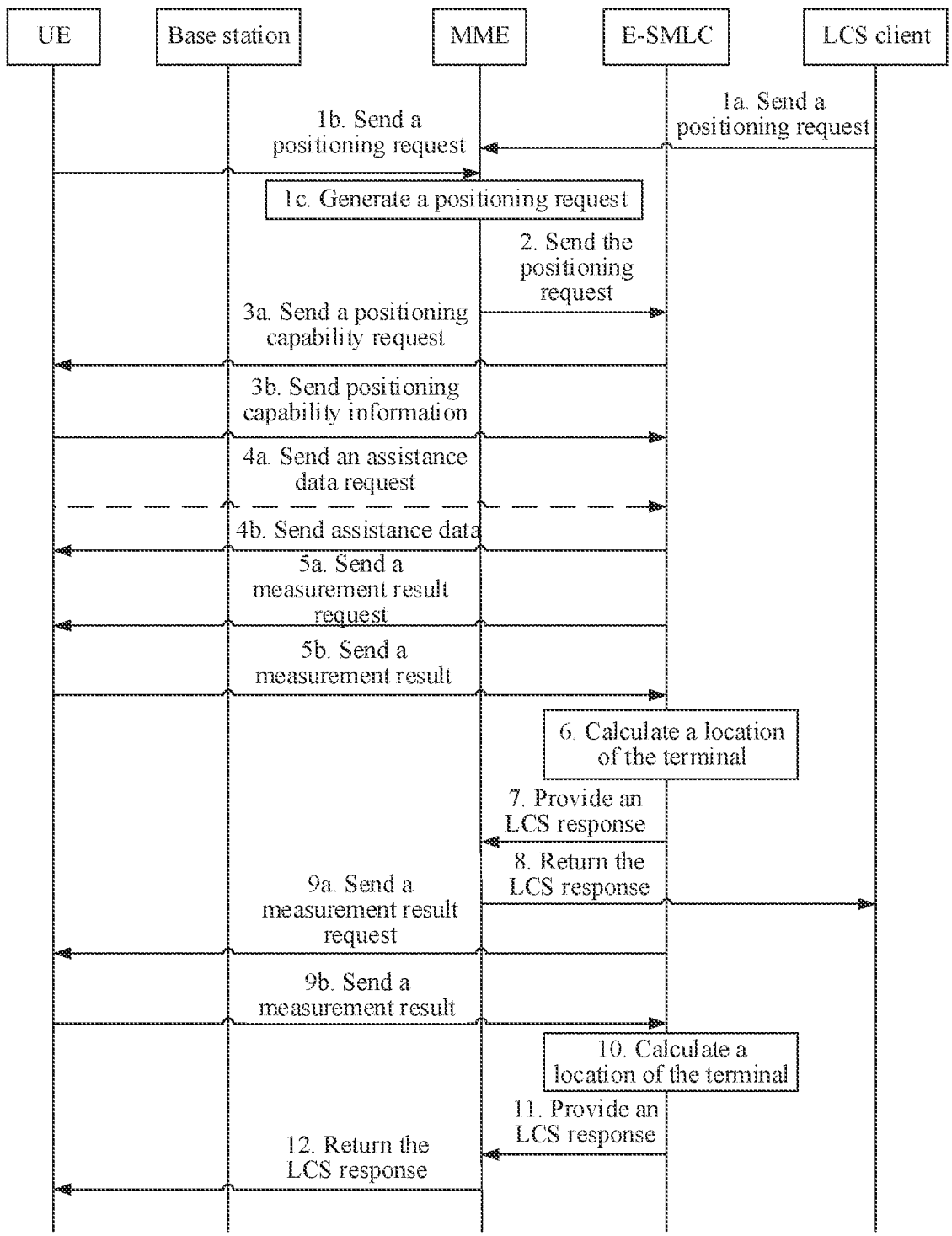
FIG. 1 is a schematic flowchart of an OTDOA positioning process.

In the description of the embodiments of the present invention, a basic signaling flow of an observed time difference of arrival (OTDOA) positioning process is first described, as shown in FIG. 1.

Step 1a: A location service client (LCS) entity in a core network sends a positioning request to a serving mobility management entity (MME), and requests a location service for a target terminal.

Step 1b: A terminal (User Equipment, UE) sends a positioning request to the MME through a non-access stratum (NAS), and requests a location service of the terminal (such as positioning or providing assistance data).

Step 1c: The MME autonomously determines to request the location service for the target terminal (for example, obtain a location of the terminal making an emergency call), and generates a positioning request.

Step 2: After receiving the positioning request, the MME sends the positioning request to an evolved serving mobile location center (E-SMLC) of a network server.

Step 3a: The E-SMLC sends a positioning capability request to the terminal.

Step 3b: The terminal sends positioning capability information to the E-SMLC.

Step 4a: The terminal sends an assistance data request to the E-SMLC, it should be noted that this step is limited to only UE-initiated positioning. If positioning is initiated by a network side, step 4b is directly performed.

Step 4b: The E-SMLC interacts with a serving base station of the terminal by using an LTE positioning protocol annex (LPPA), to obtain positioning assistance data. The E-SMLC sends the positioning assistance data to the terminal, and the terminal can measure a downlink positioning reference signal by using the positioning assistance data.

Step 5a/5b: The E-SMLC sends a measurement result request to the terminal and obtains a measurement result. It should be noted that this step is limited to only UE-initiated positioning. If the positioning is initiated by the network side, step 9a is performed.

Step 6: The E-SMLC calculates the location of the terminal by using various data.

Step 7: The E-SMLC provides an LCS response to the MME, where the LCS response includes any required result (such as an indication of success or failure, or UE location estimation).

Step 8: The MME returns the LCS response to the LCS client in the core network.

Step 9a/9b: The E-SMLC sends a measurement result request to the terminal and obtains a measurement result.

Step 10: The E-SMLC calculates a location of the terminal by using various data.

Step 11: The E-SMLC provides an LCS response to the MME, where the LCS response includes any required result.

Step 12: The MME returns the LCS response to the terminal.

It should be noted that the foregoing OTDOA positioning process is a positioning process in a long term evolution (LTE) network, and is also applicable to a new radio (NR) network. In the NR network, an access and mobility management function (AMF) entity obtains a positioning request, and sends the positioning request to a location management function (LMF) entity of a network server; the LMF performs information interaction with a terminal, for example, sending positioning assistance data, and sending a measurement result request; and the LMF calculates a location of the terminal based on measurement information reported by the terminal, and sends an LCS response to the AMF. The OTDOA positioning process in the NR network is similar to the positioning process in the LTE network described above. Details are not described herein again.

In view of a problem that a terminal positioning method in the prior art cannot satisfy a requirement for a low positioning delay, the present invention provides a positioning method, a terminal, and a network device.

Figure 2:
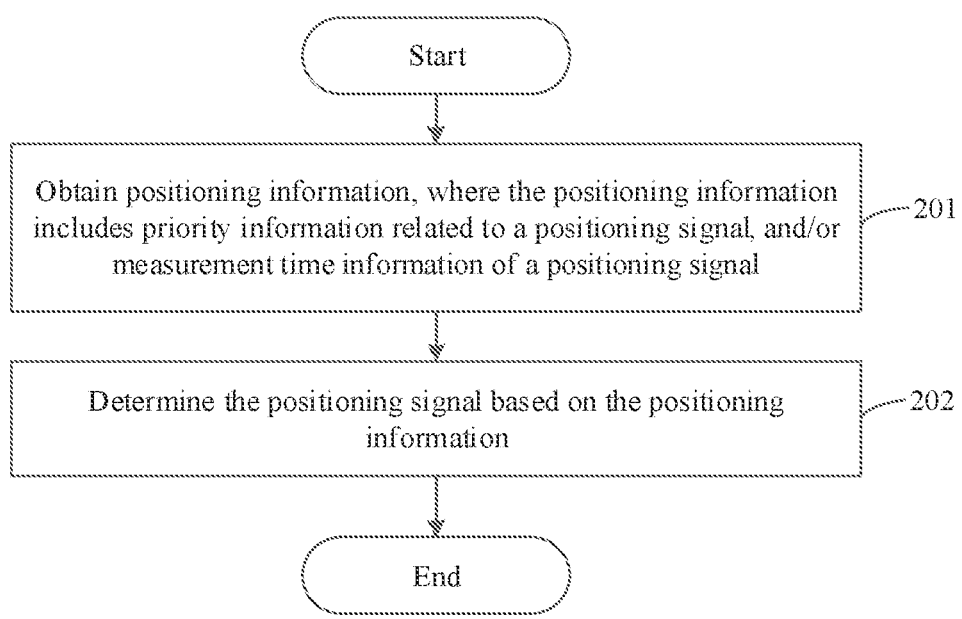
FIG. 2 is a first schematic flowchart of a positioning method according to an embodiment of the present invention.

As shown in FIG. 2, an embodiment of the present invention provides a positioning method, applied to a terminal and including the following steps.

Step 201: Obtain positioning information, where the positioning information includes priority information related to a positioning signal, and/or measurement time information of a positioning signal.

The positioning information is obtained by the terminal from a network device. The network device may include an E-SMLC, a base station, or an LMF or an evolution thereof, such as a location management center (LMC).

The terminal may request a location service from an MME or an AMF through a non-access stratum; or some entities in a core network request a location service of a target terminal from an MME or an AMF; or an MME or an AMF autonomously determines to request a location service for a target terminal. Using the MME as an example, after receiving a positioning request, the MME sends the positioning request to the E-SMLC; and the E-SMLC determines, based on the positioning request, positioning information related to terminal positioning, and sends the positioning information to the terminal.

The positioning information includes configuration information of the positioning signal. It should be noted that the positioning information includes the priority information related to the positioning signal, and/or the measurement time information of the positioning signal. In the configuration information of the positioning signal, the priority information related to the positioning signal is added. For example, when a positioning signal is sent or measured, a high-priority positioning signal is preferentially sent or measured, for example, is preferentially placed within a timestamp, and a time-frequency resource of the high-priority positioning signal may be restricted to disallow sending of another signal or data service. In this way, it is ensured that the resource of the high-priority positioning signal is not occupied or canceled, so that positioning is completed in a timely manner.

For the configuration information of the positioning signal, a time constraint is added, and an effective measurement or reporting time interval or timestamp, such as an end time, a measurement period, and duration, is defined, so that the terminal completes the measurement of the positioning signal and reporting of the measurement result within a constrained time range. In this way, it can be ensured that the positioning is completed within a predetermined time, and a delay can satisfy a requirement for a positioning delay or a requirement of the industrial Internet of Things.

It should be noted that the positioning information may be an information instruction sent by the network device, where the information instruction carries priority information of the positioning signal and/or the measurement time information of the positioning signal; or the positioning information is positioning assistance data information sent by the network device, where the positioning assistance data information carries priority information of the positioning signal and/or the measurement time information of the positioning signal; or the positioning information is a measurement result request sent by the network device, where the measurement result request carries priority information of the positioning signal and/or the measurement time information of the positioning signal; or another instruction sent by the network device carries priority information of the positioning signal and/or the measurement time information of the positioning signal. For example, when the positioning signal is a sounding reference signal (SRS), priority information of the SRS may be included in a radio resource control (RRC) SRS configuration message, and measurement time information of the SRS may be included in an LPPA message sent by the LMF or the E-SMLC to the base station.

Step 202: Determine the positioning signal based on the positioning information.

Specifically, the determining the positioning signal based on the positioning information may include: determining a to-be-measured positioning signal based on the positioning information; or determining a to-be-sent positioning signal based on the positioning information. The positioning signal may be a positioning signal to be measured by the terminal or a positioning signal to be sent by the terminal to the network device. When the positioning signal is the positioning signal to be measured by the terminal, the positioning signal may be a positioning reference signal (PRS), and the PRS is sent by the base station to the terminal. When the positioning signal is the positioning signal to be sent by the terminal, the positioning signal may be an SRS, and the SRS is sent by the terminal to the base station and the SRS is measured by the base station.

In this embodiment of the present invention, the priority information related to the positioning signal and/or the measurement time information of the positioning signal are/is added to the positioning information. Therefore, a high-priority positioning signal can be sent or measured preferentially, or the terminal can complete the measurement of the positioning signal and reporting of the measurement result within a constrained time range. In this way, it can be ensured that the positioning is completed within a predetermined time, and a requirement for a low positioning delay can be satisfied.

Optionally, before the obtaining positioning information, the method further includes: sending a positioning request, where the positioning request includes a request for positioning the terminal, and/or a positioning assistance data request.

In this embodiment, the request for positioning the terminal may be: a request sent by the terminal to the MME or AMF through the non-access stratum to request the location service. Optionally, the request for positioning the terminal may be: a request sent by an external server or a gateway to the MME to request a location of the terminal; or a location request sent by the terminal to the LMF or the LMC through the non-access stratum.

In this embodiment, the positioning assistance data request is used by the terminal to obtain positioning assistance data used for the measurement from the network device.

Optionally, the E-SMLC interacts with a serving base station of the terminal by using an LPPA protocol, to obtain the positioning assistance data. The positioning assistance data includes but is not limited to: information of a serving cell (information such as a physical cell identifier, a positioning reference signal configuration, a cell frequency, and timing) and information of a neighboring cell (information such as a physical cell identifier, a positioning reference signal configuration, a cell frequency, and timing of the neighboring cell), The selected neighboring cell is a cell that is advantageous for the measurement and is obtained in advance after a geographical location of the terminal is roughly determined; or may be a neighboring cell obtained by the ATF or MME through area determining and then neighboring cell deletion and selection.

Optionally, the positioning request further includes at least one of the following: positioning request type information, positioning capability information, response delay information, and accuracy information.

The positioning request type information includes at least one of the following: a positioning request of a low delay type, and a positioning request of a high accuracy type. The positioning request of the low delay type may be indicated by an information unit. When there is a delay requirement, the information unit is enabled. Further, the low delay is a delay less than a threshold, there may be one or more thresholds, and a quantity of the thresholds determines a low delay indication bit. Further, a low delay request may use a same information element (IE) as the information unit, or may use a different IE. In a case of different IEs, when the information unit is enabled, a low delay indication unit is valid; otherwise, the low delay indication unit is invalid. The positioning request of the high accuracy type may be indicated by an information unit. When there is an accuracy requirement, the information unit is enabled, and the information unit may be the same as or different from the low delay information unit. Further, the high accuracy means that positioning accuracy is greater than a threshold, and the positioning accuracy is generally proximity between spatial entity location information (such as coordinates) and a real location. There may be one or more thresholds for the high accuracy, and a quantity of the thresholds determines a high accuracy indication bit. Further, a high accuracy positioning request may use a same IE as the information unit, or may use a different IE. In a case of different IEs, when the information unit is enabled, a high accuracy indication unit is valid; otherwise, the high accuracy indication unit is invalid.

The response delay information is information related to a positioning delay requirement of the target terminal, such as a specific delay time or a delay range of the request. The accuracy information is information related to a positioning accuracy requirement of the target terminal, such as a specific accuracy value or an accuracy range of the requirement.

The positioning capability information includes at least one of the following: a measurement capability, a mode capability, an inter-frequency measurement capability, and a delay measurement capability. The measurement capability is a capability of measuring the positioning signal, such as a supported bandwidth, a quantity of resources, a quantity of reference signal received power (RSRP), a quantity of frequency layers, a quantity of transmission and reception points (TRP) in a set, a quantity of sets, and a quantity of total resources (total resources).

The mode capability means whether and which of the following positioning modes are supported: UE-BASE (terminal-based positioning mode). UE-ASSISTED (terminal-assisted positioning mode), and STANDLONE (standalone terminal positioning mode).

The inter-frequency measurement capability means whether an inter-frequency reference signal time difference (RSTD) measurement is supported, and an inter-frequency RSTD measurement capability.

The delay measurement capability means whether a positioning signal measurement satisfies a low-delay requirement and a low-delay measurement capability.

Further, the positioning information may include the positioning assistance data information sent by the network device. The terminal may first send a positioning assistance data request to the network device, where the positioning assistance data request includes low-delay assistance information request information, and the network device sends positioning assistance data information satisfying the low-delay requirement to the terminal; or the network device sends, based on a low-delay positioning request for the terminal by an entity in the core network or the MME or the AMF or an evolution thereof, positioning assistance data information satisfying the low-delay requirement to the terminal; or the terminal or another terminal sends a low-delay positioning request to the network device through the non-access stratum, and the network device sends positioning assistance data information satisfying the low-delay requirement to the terminal. Further, the low-delay assistance information request information may be a type of assistance information, and is indicated by a specific IE or bit.

Specifically, the positioning information includes but is not limited to at least one of the following:
  (a) Configuration information of a positioning signal with a target priority. The positioning signal with the target priority may be a positioning signal with a high priority, and the high priority is determined based on a requirement. For example, the high priority is a first priority.
  (b) Configuration information of a positioning signal configured based on a geographical location. Specifically, a plurality of pieces of positioning assistance data may be centrally predefined based on the geographical location of the terminal or a geographical location of a cell. A representation of this may be: positioning assistance data of UEs in a same cell is different, or an order of positioning assistance data of UEs in a same cell list is different.
  (c) Configuration information related to cancellation of repeated signal transmission. For example, a repetition factor is configured as 1, or when there is a new parameter introduced or a valid configuration, a repetition factor configuration is invalid.
  (d) Configuration information related to cancellation of a measurement gap. With regard to an inter-frequency measurement, when the terminal is in a measurement gap, the terminal does not send any data to the base station, and the base station does not schedule any resource for the terminal either. Therefore, the setting of the measurement gap may affect a delay of terminal positioning. In the positioning assistance data information sent by the network device, measurement handover signaling (such as a blind handover) may be configured for the terminal, and a neighboring cell measurement process is removed, to forcibly save the time of the measurement gap and satisfy the low-delay requirement; or when there is a new parameter introduced or a valid configuration, the measurement gap is invalid, and the measurement is performed only on a current bandwidth part (BWP).
  (e) Configuration information related to reduction of a quantity of measurements, for example, a quantity of TRPs, or a quantity of neighboring cell measurements.
  (f) Measurement time information. The measurement time information is used to constrain a measurement or reporting time of the positioning signal. Information such as a start time, an end time, duration, and a period of the measurement or reporting of the positioning signal may be constrained by configuring a measurement timer for the terminal. The measurement time information may alternatively be configured as a time window, so that the measurement of the positioning signal and reporting of the measurement result are completed within the measurement time window.
  (g) Configuration information of a default positioning signal, or configuration information of a preconfigured positioning signal. When a special request such as a low delay request is triggered or a low delay request is terminated, switching is performed to positioning configuration information of the default positioning signal or positioning configuration information of the preconfigured positioning signal.
  (h) Configuration information of an aperiodic positioning signal, including one of the following:
  a trigger condition;
  configuration information, where optionally, the configuration information includes one of the following: a slot offset, and a symbol num (a quantity of symbols); and
  an optional activation configuration group, such as different PRS resource groups, including one or more resources.

Further, the measurement time information may be carried in the measurement result request sent by the network device. Optionally, the obtaining positioning information may include: receiving the measurement result request for the positioning signal, where the measurement result request includes the measurement time information of the positioning signal. In this embodiment, the measurement result request may include measurement configuration information, where the measurement configuration information includes the measurement time information. In addition to the measurement time information, the measurement result request may further include but is not limited to a multi-path RSTD, a maximum quantity of neighboring cell measurements, and a motion information measurement request. Optionally, a result may also be reported by using a measurement result and motion measurement information from obtaining the measurement result to reporting the measurement result, to satisfy a low-delay positioning request. In this case, a time point of the motion measurement information needs to be combined with a time point of the measurement, and the result may be reported jointly when there is a low-delay requirement.

In this embodiment, the measurement result request carries the measurement time information of the positioning signal, so that the terminal can accurately learn a measurement range of the positioning signal. In this way, a start time and an end time of the measurement by the terminal are specified, the measurement range can be effectively narrowed, the measurement of the positioning signal and reporting of the measurement result are completed in a timely manner, and the low-delay requirement is satisfied.

Specifically, a configuration mode of the measurement time information includes but is not limited to the following two modes.

Mode 1: The measurement time information includes configuration information of a measurement timer. The network device configures a measurement timer for the terminal. Based on expiration of the measurement timer, the terminal reports a signal measurement result obtained at a current time point.

The configuration information of the measurement timer may include at least one of the following:
  (a) start time information of the measurement timer; and
  (b) timing time information of the measurement timer.

A value or duration of the measurement timer is related to a delay requirement of the positioning service. A timing time of the measurement timer may be determined based on a delay-related function, for example, timing time=f (delay, SFN0 OFFSET (system frame number offset)); or a timing time of the measurement timer is a fixed value, such as 0.1 ms, 0.5 ms, 1 ms, 4 ms, 5 ms, or 10 ms, or a timing time related to a numerology (parameter set), such as $2^u*(0.1, 0.5, 1, 4, 5, 10)$ ms; or a timing time of the measurement timer is several slots.

It should be noted that a configuration mode of the measurement timer includes but is not limited to the following configuration modes:
(1) preconfiguration: starting or stopping the measurement timer based on a configured time of the positioning signal;
(2) implicit configuration: when a first positioning signal is measured, starting or stopping the measurement timer; and
(3) explicit configuration: configuring a parameter related to starting or stopping the measurement timer.

Specifically, a start time of the measurement timer may be one of the following:
(a) an offset relative to a system frame number or a slot number of a serving cell or base station;
(b) a time offset relative to a reference resource se or a target resource set, where the time offset relative to the target resource set may be an offset of a start position of a resource set specified based on a requirement; and the time offset relative to the reference resource set may be a negative number, and a reference time provided by a downlink PRS or an RSTD reference signal may include an identifier, such as a PRS resource set identifier, or a single PRS resource identifier, or a PRS resource list identifier;
(c) a time offset relative to the positioning signal, which may be an offset relative to a start measurement time of the first positioning signal;
(d) an offset relative to a start time of a first resource set; and
(e) absolute time information, where the absolute time means that a start time of the first measurement time window is specific time information instead of a relative time offset.

Mode 2: The measurement time information includes configuration information of at least one measurement time window. The network device configures a signal measurement time window for the terminal, and the terminal measures the signal only in the measurement time window.

The configuration information of the at least one measurement time window includes duration information of the at least one measurement time window.

The duration information of the at least one measurement time window is related to the delay requirement of the positioning signal, and the duration information of the at least one measurement time window may be determined based on the delay-related function, for example, duration of the at least one measurement time window=f (delay, SFN0 OFFSET); or the duration information of the at least one measurement time window is a fixed value, such as 0.1 ms, 0.5 ms, 1 ms, 4 ms, 5 ms, or 10 ms; or the duration information of the at least one measurement time window is a value related to the numerology, and the parameter set includes a subcarrier spacing, a symbol length, a cyclic prefix length, and the like, such as $2^u*(0.1, 0.5, 1, 4, 5, 10)$ ms; or a timing time of the measurement timer is several slots. It should be noted that delays corresponding to different measurement time windows may be the same or different, and corresponding calculation functions may be the same or different, and corresponding fixed values may be the same or different.

A period of the at least one measurement time window may be longer than or equal to a period of the positioning signal. A configuration mode of the period of the at least one measurement time window may be: an implicit configuration, for example, the same as the period of the positioning signal when not configured; or an explicit configuration, for example, an integer multiple of the period of the positioning signal.

The duration of the at least one measurement time window may be shorter than or equal to the period of the positioning signal. The duration of the at least one measurement time window is shorter than or equal to a delay. The delay may be a delay when the terminal is requested to return the result, or may be a measurement delay, or may be a measurement delay estimated based on the result requested to be returned.

Further, the configuration information of the at least one measurement time window may further include start time information of the at least one measurement time window.

The start time may be determined based on one of the following:
(a) an offset relative to a system frame number or a slat number of a serving cell or base station;
(b) a time offset relative to a reference resource set or a target resource set, where the time offset relative to the target resource set may be an offset of a start position of a resource set specified based on a requirement; and the time offset relative to the reference resource set may be a negative number, and a reference time provided by a downlink PRS or an RSTD reference signal may include an identifier, such as a PRS resource set identifier, or a single PRS resource identifier, or a PRS resource list identifier;
(c) a time offset relative to the positioning signal, which may be an offset relative to a start measurement time of the first positioning signal;
(d) an offset relative to a start time of a first resource set; and
(e) absolute time information, where the absolute time means that a start time of the at least one measurement time window is specific time information instead of a relative time offset.

The configuration information of the at least one measurement time window may further include end time information of the at least one measurement time window, and specify an end time of the measurement or reporting by the terminal. It should be noted that the at least one measurement time window is the same for a same positioning frequency layer, that is, the at least one measurement time window may be configured in a parameter of a positioning frequency layer.

A configuration mode of the at least one measurement time window includes but is not limited to the following configuration modes:
(1) preconfiguration: configuring the start time and end time of the at least one measurement time window based on a configured time of the positioning signal;
(2) implicit configuration: a time when the first positioning signal is measured is the start or end time of the at least one measurement time window; and
(3) explicit configuration: configuring a parameter related to starting or ending of the at least one measurement time window.

The following describes content of the configuration information of the measurement time window by using an example in which the measurement time information includes configuration information of a first measurement time window and configuration information of a second measurement time window. In this embodiment, when a synchronization signal and PBCH block (Synchronization Signal and PBCH block, SSB) is measured, the second measurement time window is introduced on a basis of the first measurement time window, Where the first measurement time window may be used for a measurement in an idle state, and a configured period thereof is relatively long; and the second measurement time window is used for a measurement in a connected state, and a configured period thereof is relatively short and needs to be shorter than that of the first measurement time window. Considering that PRS resources are configured repeatedly and that a relatively long period of the first measurement time window is configured (for example, several times a PRS period), possibly only a plurality of repeated resources are included within duration of the first measurement time window. Therefore, it is necessary to configure the second measurement time window with a relatively short period, where the period of the second measurement time window may be associated with a repetition factor of resources or a repetition interval, and duration of the second measurement time window is shorter than the time interval of the repetition factor, so that PRSs on different beams can be measured in the second measurement time window.

Optionally, the period of the second measurement time window is shorter than the period of the first measurement time window;
a time offset of a start position of the second measurement time window is consistent with a time offset of a start position of the first measurement time window; or relative to a start position of the first measurement time window;
the duration of the second measurement time window is shorter than or equal to the duration of the first measurement time window; and
the period and/or duration of the second measurement time window may be related to at least one of a repetition factor and a repetition interval of the configuration information of the positioning signal.

Specifically, in a case in which the measurement time information includes configuration information of a plurality of measurement time windows, step 102 may include: determining the positioning signal within an overlapping area of the plurality of measurement time windows; for example, when two measurement time windows are included, determining a positioning signal within an overlapping area of the two measurement time windows; or when three or more measurement time windows are included, determining positioning information within an overlapping area according to a preset rule, for example, determining a positioning signal within an overlapping area involving a largest quantity of measurement time windows, and a positioning signal within a largest (smallest) overlapping area formed by at least two of the plurality of measurement time windows.

Assuming that the measurement time information includes the first measurement time window and the second measurement time window, when the terminal needs to measure a PRS, the terminal measures only the PRS within an overlapping area of the first measurement time window and the second measurement time window; and when the terminal needs to send an SRS, the terminal sends the SRS only within the overlapping area of the first measurement time window and the second measurement time window.

The foregoing is the positioning method when the positioning information includes the measurement time information of the positioning signal. By using a specific embodiment, the following describes the positioning method when the positioning information includes the priority information related to the positioning signal.

Optionally, the priority information related to the positioning signal includes priority information of the positioning signal; and a time-frequency resource corresponding to a positioning signal with a target priority satisfies at least one of the following conditions:
the time-frequency resource corresponding to the positioning signal with the target priority is allowed to be occupied by a data service whose priority is the target priority;
the time-frequency resource corresponding to the positioning signal with the target priority is not allowed to be occupied by a data service whose priority is lower than the target priority; and
the time-frequency resource corresponding to the positioning signal with the target priority is not allowed to be occupied by a signal whose priority is lower than the target priority.

In this embodiment, the positioning signal with the target priority may be a positioning signal with a high priority, such as a first priority. To ensure timely completion of positioning, for a time-frequency resource of the high-priority positioning signal, transmission of another physical downlink shared channel (PDSCH) or physical uplink control channel (PUCCH) or reference signal (RS) signal is not expected. In addition, the time-frequency resource of the high-priority positioning signal may be occupied by a high-priority data service.

Optionally, the positioning information includes the configuration information of the positioning signal. Further, the configuration information of the positioning signal includes al least one of the following: a quantity of orthogonal frequency division multiplexing OFDM symbols of the positioning signal is 1 or 2; and the positioning signal supports a cyclic shift greater than 12, such as 16, 24, or 48. Further, the positioning signal has default configuration information. It should be noted that the configuration information of the positioning signal may be configuration information of the positioning signal with the target priority, that is, when the network device configures the positioning signal for the terminal, the positioning signal is configured as a high-priority positioning signal; or the configuration information of the positioning signal is configuration information of an aperiodic positioning signal; or the configuration information of the positioning signal is configuration information of a default or special positioning signal, such as configuration information of a high-priority positioning signal or configuration information of a low-delay positioning signal.

It should be noted that in a case in which the positioning information includes the priority information related to the positioning signal, after validity of a positioning signal with a target priority expires, a default configuration or another configuration is restored. The another configuration may be configuration information for which no priority is set, or periodic or semi-static configuration information. In this embodiment, because there is a case in which the time-frequency resource of the positioning signal with the target priority is not allowed to be occupied by a data service or signal whose priority is lower than the target priority, the terminal for which a high-priority positioning signal is configured does not expect to process a low-priority positioning signal at the same time. To avoid impact on transmission of other signals, a validity period may be configured for the target priority of the positioning signal. After the validity period of the target priority expires, the default configuration may be restored, or a configuration of the positioning signal before the priority information is configured may be restored, so that the other signals can be transmitted normally. If there is still a requirement for low-delay positioning, the priority of the positioning signal may be reconfigured.

Optionally, the priority information related to the positioning signal includes priority information of a measurement result request; and optionally, the positioning information includes a measurement result request for the positioning signal, where the measurement result request includes priority information of the measurement result request.

A time-frequency resource corresponding to a measurement result request with a target priority satisfies at least one of the following conditions:

the time-frequency resource corresponding to the measurement result request with the target priority is allowed to be occupied by a data service whose priority is the target priority;

the time-frequency resource corresponding to the measurement result request with the target priority is not allowed to be occupied by a data service whose priority is lower than the target priority; and the time-frequency resource corresponding to the measurement result request with the target priority is not allowed to be occupied by a signal whose priority is lower than the target priority.

In this embodiment, the measurement result request with the target priority may be a measurement result request with a high priority, such as a first priority. To ensure timely reporting of the measurement result, for requesting or reporting of the positioning result with the high priority, transmission of another PDSCH or PUCCH or reference signal is not expected. The time-frequency resource for requesting or reporting the positioning result with the high priority may be occupied by a high-priority data service. Optionally, the measurement result request may further include repetition information of the measurement result.

After receiving the measurement result request, the terminal measures the positioning signal, and feeds back the measurement result to the network device. Optionally, the method further includes:

sending a measurement result of the positioning signal, where the measurement result includes a type of the measurement result and/or priority information of the measurement result. The type of the measurement result may indicate whether the measurement result is a low-delay measurement result or an eMBB measurement result.

In a case in which the measurement result includes the type of the measurement result, optionally, the type of the measurement result is indicated by using at least one of the following manners:

(a) an indication identifier of a measurement result related to a delay, where optionally, the indication identifier indicates that the result is a low-delay measurement result;

(b) an indication identifier of a measurement result related to applying a target positioning signal, where the target positioning signal may be a low-delay or high-priority or preconfigured positioning signal; assuming that the target positioning signal is the low-delay positioning signal, the network device configures low-delay positioning information for the terminal; and the terminal applies the positioning information to measure the positioning signal, and the measurement result may be represented by a specific indication identifier;

(c) an indication identifier of a measurement result of measuring a target positioning where the target positioning signal may be a low-delay or high-priority positioning signal; assuming that the target positioning signal is the high-priority positioning signal, the network device configures the high-priority positioning signal for the terminal, and the terminal may represent, by using a specific indication identifier, the measurement result obtained by measuring the positioning signal;

(d) an indication identifier of a measurement result reported with reference to a motion sensor; and (e) the type of the measurement result indicated by using a new information element IE, where the IE may be a measurement time, that is, the type of the measurement result is distinguished by the measurement time.

It should be noted that, before reporting the measurement result of the positioning signal, the terminal further needs to determine an uplink resource to reduce a reporting waiting time. The uplink resource may be requested by the terminal from the network device, or may be actively configured by the network device.

Optionally, before the sending a measurement result of the positioning signal, the method further includes: sending an uplink resource request; and the uplink resource request includes at least one of the following:

a reason for the uplink resource request, such as using the uplink resource to send configuration information related to a low-delay positioning requirement;

a type of the uplink resource request, where the type includes: periodic, aperiodic, or semi-static;

a resource size; and priority information of the uplink resource request, where for example, for a high-priority positioning signal, a high-priority uplink resource needs to be requested.

The network device receives the uplink resource request sent by the terminal, configures an uplink resource based on content of the request, and sends uplink resource configuration information to the terminal, Assuming that the network device is the E-SMLC or the LMF, the E-SMLC or the LMF may configure an uplink resource based on the configuration information of the positioning signal, and send uplink resource configuration information to the terminal and the base station; or as prescribed by a protocol, the E-SMLC or the LMF sends uplink resource configuration information to the terminal and the base station according to the protocol and information preconfigured by a higher layer.

Specifically, the positioning information may include the uplink resource configuration information.

A configuration mode of the uplink resource configuration information includes one of the following:

(1) The uplink resource configuration information is configured based on the configuration information of the positioning signal and/or the measurement time information of the positioning signal.

Specifically, the configuration mode includes but is not limited to configuring a grant, configuring a UL grant (configuring an uplink grant), a dynamic configuration of downlink control information (DCI), an RRC preconfiguration, and a lightweight presentation protocol (LPP) preconfiguration. If the configuration mode is a preconfiguration, the measurement time may be agreed upon in advance, and reporting is performed upon expiration of the time. If the configuration is performed by the serving cell, the serving cell may obtain a start measurement time and a measurement window by using LPPA, and preconfigure an uplink resource. If the configuration is performed by the LMF or a location server, an uplink resource is allocated based on a signal configuration and a slot format indicator (SFI) of the serving cell, and configured for the terminal and the serving cell separately.

(2) The uplink resource configuration information is configured based on the uplink resource request.

If the terminal has sent the uplink resource request, the network device may configure the uplink resource configuration information based on the uplink resource request. Specifically, the configuration mode includes but is not limited to configuring a grant, configuring a UL grant, a dynamic configuration of DCI, an RRC preconfiguration, and an LPP preconfiguration. If the configuration mode is a preconfiguration, the measurement time may be agreed upon in advance, and reporting is performed upon expiration of the time. If the configuration is performed by the serving cell, the serving cell may obtain a start measurement time and a measurement window by using LPPA, and preconfigure an uplink resource or configure an uplink resource based on a request of the terminal. If the configuration is performed by the LMF or a location server, an uplink resource is allocated based on a signal configuration and an SFI of the serving cell, and configured for the terminal and the serving cell separately.

(3) The uplink resource configuration information is preconfigured by a protocol or a higher layer. Based on an uplink resource of the positioning signal specified in the protocol, the E-SMLC or the LMF may send configuration information of the uplink resource to the terminal and the serving cell.

In this embodiment, before the terminal reports the measurement result, the uplink resource configuration information is obtained. In this way, the reporting waiting time is saved, reporting of the measurement information can be completed in a timely manner, and a requirement for a low positioning delay can be satisfied.

Optionally, the positioning signal is an aperiodic positioning reference signal PRS; and the aperiodic PRS may be a PRS with a target priority. Assuming that the target priority is a high priority, the high-priority or low-delay positioning request may trigger a configuration of the aperiodic PRS. The aperiodic PRS is configured as a high-priority PRS, and for a time-frequency resource of the high-priority PRS, transmission of another PDSCH or PUCCH or SRS or PRS is not expected.

A configuration mode of the aperiodic PRS may be a preconfiguration or a default configuration. Optionally, after the determining the positioning signal based on the positioning information, the method further includes:

sending an aperiodic PRS request to the network device, where the network device receiving the request sends an aperiodic PRS in a time-domain position related to a cell location of the network device; and the terminal receives the aperiodic PRS, and measures the PRS based on measurement time information in configuration information of the PRS, or measures the PRS based on configuration information of a target priority of the PRS.

For example, the measurement time information is configuration information of a measurement time window. In this case, the terminal directly measures the PRS based on a preconfigured time window; or the terminal sends a high-priority service request, and the E-SMLC switches the configuration information of the PRS to a high priority, and the terminal measures the PRS based on the high-priority configuration information.

Alternatively, a configuration mode of the aperiodic PRS may be: the LMF preconfigures the PRS based on the request of the terminal, where the aperiodic PRS overlaps a periodic PRS, and the periodic PRS is dropped; or the aperiodic PRS overlaps low-priority data, and the low-priority data is dropped.

Alternatively, a configuration mode of the aperiodic PRS may be: the LMF directly configures the aperiodic PRS based on the positioning request. The configuration information is configured for the terminal by using the LPP or NR positioning protocol (NRPP) or an evolution thereof, and is configured for the related cell or base station by using LPPA (or NRPPA or an evolution thereof), where the aperiodic PRS overlaps a periodic PRS, and the periodic PRS is dropped; or the aperiodic PRS overlaps low-priority data, and the low-priority data is dropped.

Alternatively, a configuration mode of the aperiodic PRS may be: the UE or the LMF activates the configuration of the aperiodic PRS by using activation signaling.

In addition, upon expiration of the configuration of the aperiodic PRS, a default configuration or an original configuration or a configuration of the periodic PRS is restored.

Figure 3:
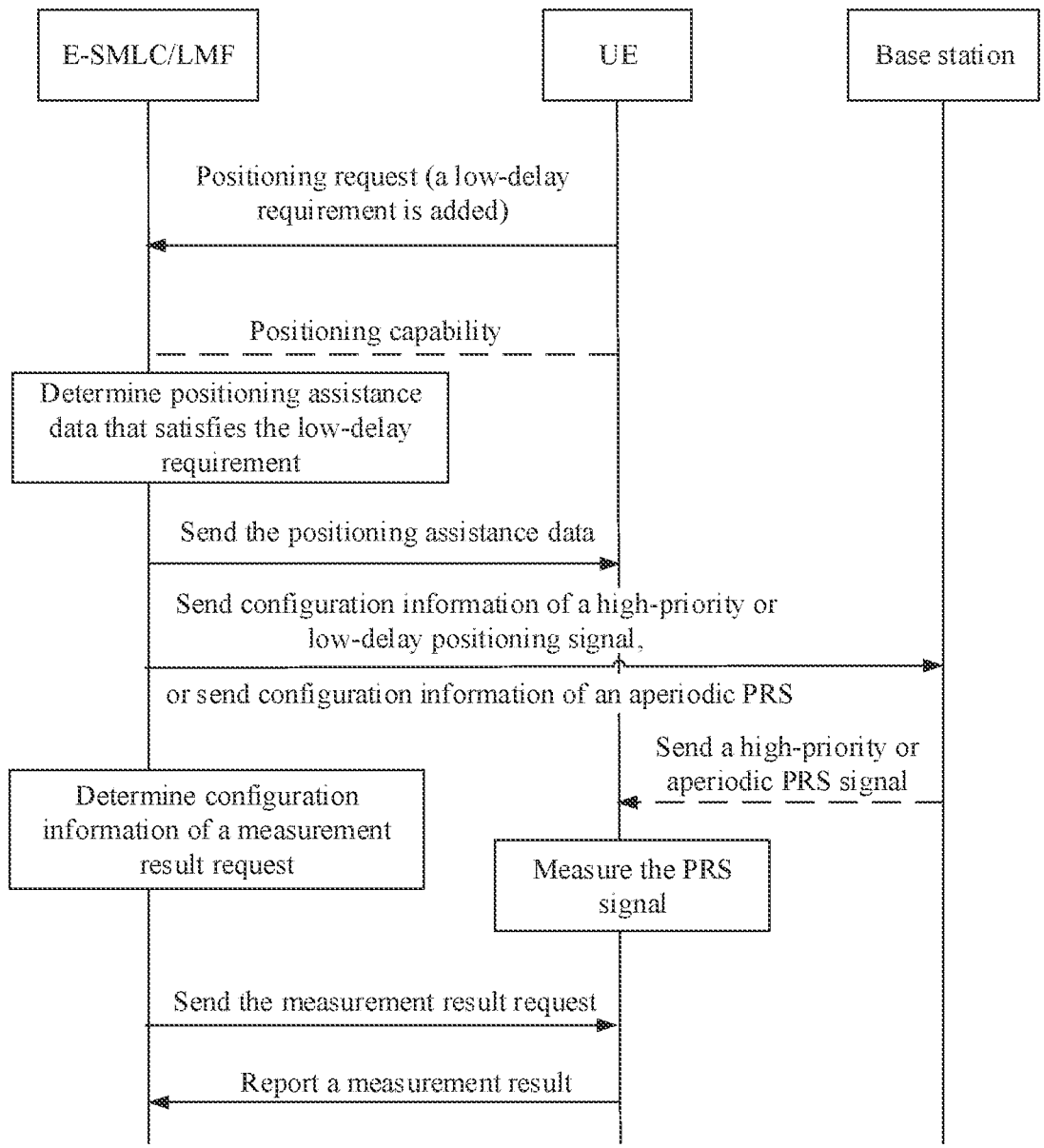
FIG. 3 is a second schematic flowchart of a positioning method according to an embodiment of the present invention.

By using a specific embodiment, the following describes steps of the positioning method when the positioning signal is an aperiodic PRS with a target priority. Assuming that the positioning information includes positioning assistance data information and a measurement result request, as shown in FIG. 3, the terminal sends a positioning request to the E-SMLC or the LMF, where the positioning request is a positioning request in which a low-delay requirement is added; after receiving the positioning request, the E-SMLC or the LMF determines a positioning capability of the terminal (this step may be performed by default); the E-SMLC or the LMF determines, based on the positioning request, positioning assistance data that satisfies the low-delay requirement; the E-SMLC or the LMF sends the low-delay positioning assistance data to the terminal, and sends configuration information of a high-priority or low-delay positioning signal or configuration information of an aperiodic PRS to the base station; the base station sends a high-priority or aperiodic PRS to the terminal based on the configuration information of the positioning signal; the terminal measures the PRS and obtains a measurement result; the E-SMLC or the LMF determines configuration information of the measurement result request (this step may be performed by default), and sends the measurement result request to the terminal based on the configuration information of the measurement result request (this step may be performed by default); and the terminal reports the measurement result.

Optionally, the positioning signal is an aperiodic sounding reference signal SRS with a target priority. Assuming that the target priority is a high priority, a high-priority positioning request may trigger a configuration of an aperiodic SRS. The aperiodic SRS is configured as a high-priority SRS, and for a time-frequency resource of the SRS, transmission of another PDSCH or PUCCH or SRS or PRS is not expected. A configuration mode of the aperiodic SRS is a preconfiguration or a dynamic configuration.

The aperiodic sounding reference signal SRS with the target priority may be activated by using DCI, or may be activated by using a combination of a preconfiguration and DCI, or is preconfigured and specified by a protocol.

Specifically, after the determining the positioning signal based on the positioning information, the method further includes: sending the aperiodic sounding reference signal SRS to the network device based on the positioning information. There may be an interval time T between a sending time of the SRS and the positioning request, or a sending time of the SRS may be configured by an information unit explicitly or prescribed by a protocol.

Figure 4:
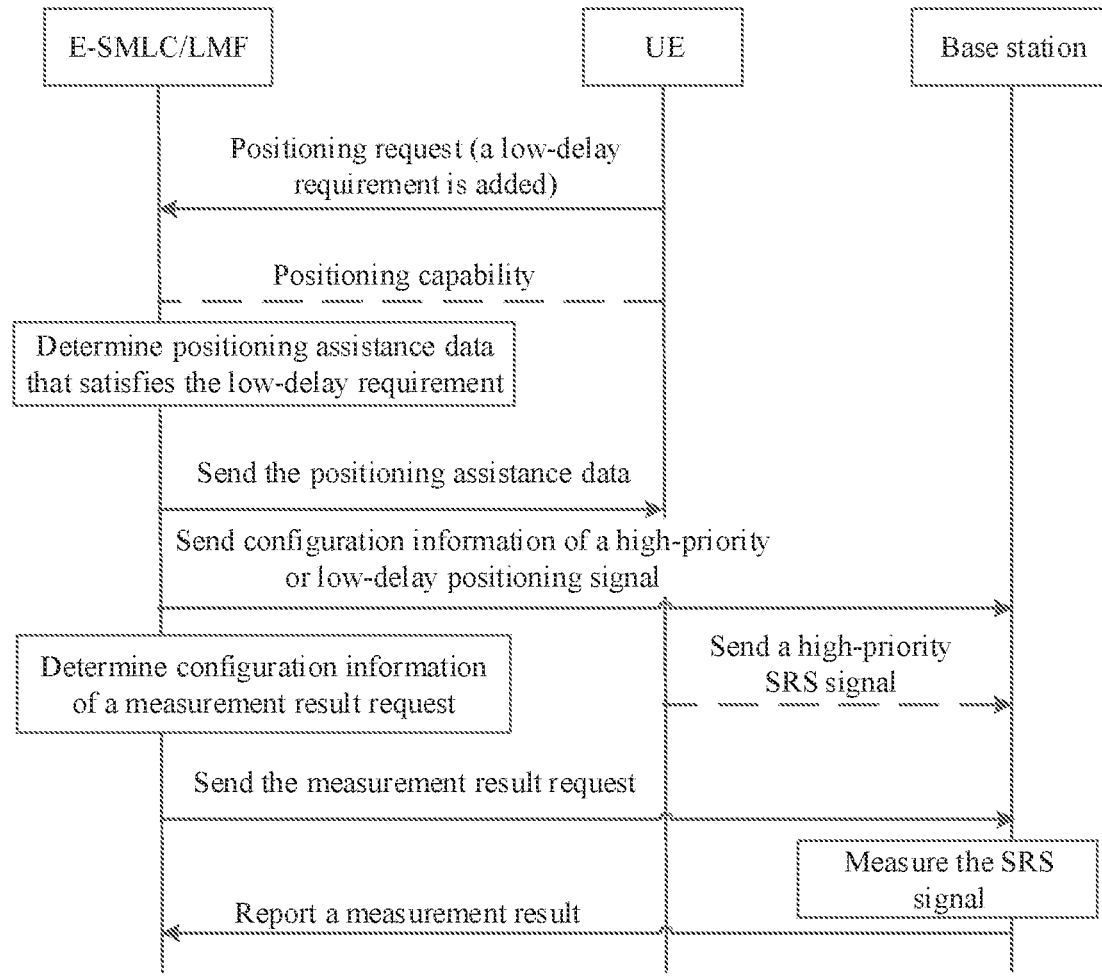
FIG. 4 is a third schematic flowchart of a positioning method according to an embodiment of the present invention.

By using a specific embodiment, the following describes steps of the positioning method when the positioning signal is an aperiodic SRS with a target priority. Assuming that the positioning information includes positioning assistance data information and a measurement result request, as shown in FIG. 4, the terminal sends a positioning request to the E-SMLC or the LMF, where the positioning request is a positioning request in which a low-delay requirement is added; after receiving the positioning request, the E-SMLC or the LMF determines a positioning capability of the terminal (this step may be performed by default); the E-SMLC or the LMF determines, based on the positioning request, positioning assistance data that satisfies the low-delay requirement; the E-SMLC or the LMF sends the low-delay positioning assistance data to the terminal, and sends configuration information of a high-priority or low-delay positioning signal to the base station; the terminal sends a high-priority or aperiodic SRS to the base station; the E-SMLC or the LMF determines configuration information of the measurement result request, and sends the measurement result request to the base station based on the configuration information of the measurement result request (this step may be performed by default); and the base station measures the SRS to obtain a measurement result, and reports the measurement result.

In this embodiment of the present invention, the priority information related to the positioning signal and/or the measurement time information of the positioning signal are/is added to the positioning information. Therefore, a high-priority positioning signal can be sent or measured preferentially, or the terminal can complete the measurement of the positioning signal and reporting of the measurement result within a constrained time range. In this way, it can be ensured that the positioning is completed within a predetermined time, and a requirement for a low positioning delay can be satisfied.

Figure 5:
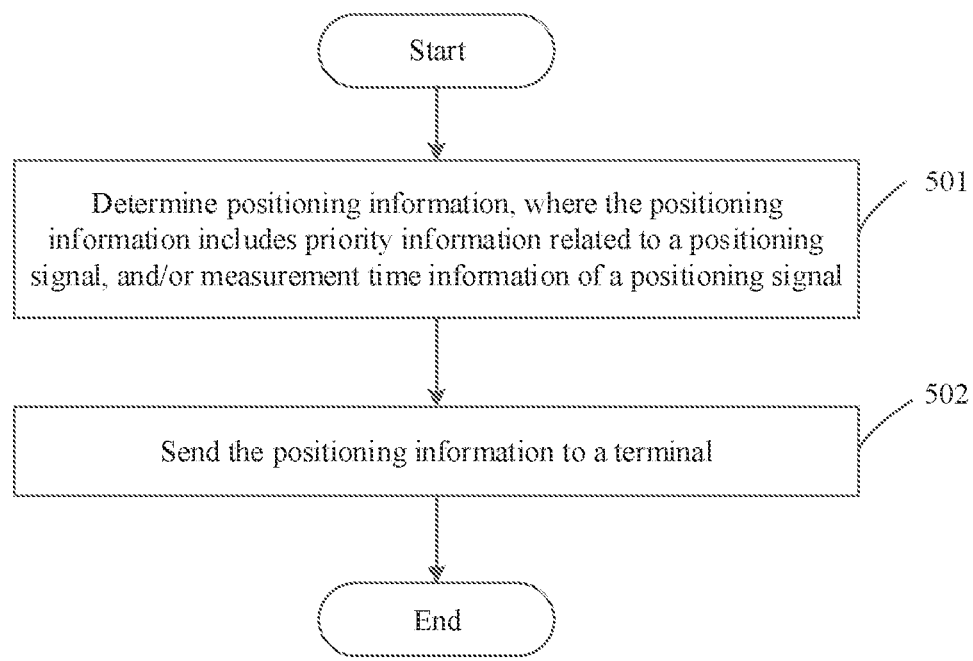
FIG. 5 is a fourth schematic flowchart of a positioning method according to an embodiment of the present invention.

As shown in FIG. 5, an embodiment of the present invention provides a positioning method, applied to a network device and including the following steps.

Step 501: Determine positioning information, where the positioning information includes priority information related to a positioning signal, and/or measurement time information of a positioning signal.

In this embodiment, the network device may include an E-SMLC, a base station, or an LMF or an evolution thereof, such as an LMC. The positioning information includes configuration information of the positioning signal. It should be noted that the positioning information includes the priority information related to the positioning signal, and/or the measurement time information of the positioning signal. In the configuration information of the positioning signal, adding the priority information related to the positioning signal can ensure that a resource of a high-priority positioning signal is not occupied or canceled, so that positioning can be completed in a timely manner.

For the configuration information of the positioning signal, a time constraint is added, and an effective measurement or reporting time interval or timestamp is defined, so that a terminal can complete a measurement the positioning signal and reporting of the measurement result within a constrained time range. In this way, it can be ensured that the positioning is completed within a predetermined time, and a delay can satisfy a requirement for a positioning delay or a requirement of the industrial Internet of Things.

In addition, in this embodiment, the positioning information may be determined based on a positioning request. For example, different positioning information may be determined based on positioning requests with different delay requirements.

Step 502: Send the positioning information to the terminal.

When the network device sends the positioning information, the positioning information may be used as an information instruction, where the information instruction carries priority information of the positioning signal and/or the measurement time information of the positioning signal, and the information instruction is sent to the terminal; or the positioning information is positioning assistance data information determined by the network device, where the positioning assistance data information carries priority information of the positioning signal and/or the measurement time information of the positioning signal; or the positioning information is a measurement result request determined by the network device, where the measurement result request carries priority information of the positioning signal and/or the measurement time information of the positioning signal. It should be noted that the network device may alternatively send the priority information of the positioning signal and/or the measurement time information of the positioning signal by using other instructions. For example, when the positioning signal is an SRS, priority information of the SRS may be included in an RRC SRS configuration message, and measurement time information of the SRS may be included in an LPPA message sent by the LMF or the E-SMLC to the base station.

After receiving the positioning information, the terminal determines a to-be-measured positioning signal based on the positioning information. The positioning signal includes a PRS, a cell reference signal (CRS), a channel state information reference signal (CSI-RS), an SSB, or a tracking reference signal (TRS). Using the PRS as an example, the terminal measures, based on the priority information of the positioning signal and/or the measurement time information of the positioning signal, the PRS sent by the base station, and obtains a measurement result; or the terminal determines a to-be-sent positioning signal, that is, an SRS, based on the positioning information, and the terminal sends the SRS to the base station; and the base station measures the SRS based on the priority information of the positioning signal and/or the measurement time information of the positioning signal.

In this embodiment of the present invention, the network device adds the priority information related to the positioning signal and/or the measurement time information of the positioning signal to the determined positioning information based on the positioning request. Therefore, a high-priority positioning signal can be sent or measured preferentially, or the terminal or the base station can complete the measurement of the positioning signal and reporting of the measurement result within a constrained time range. In this way, it can be ensured that the positioning is completed within a predetermined time, and a requirement for a low positioning delay can be satisfied.

Optionally, before the determining positioning information, the method further includes: obtaining a positioning request, where the positioning request includes a request for positioning the terminal, and/or a positioning assistance data request.

In this embodiment, the positioning request may be a location service request initiated by the terminal, or may be a location service request sent by an entity in a core network, a server, or a gateway to an MME or an AMF, or the positioning request is a location service request autonomously determined by an MME or an AMF for a target terminal. Using the MME as an example, after receiving the positioning request, the MME sends the positioning request to the E-SMLC.

Optionally, the positioning request further includes at least one of the following: positioning request type information, positioning capability information, response delay information, and accuracy information. The positioning request type information includes at least one of the following: a positioning request of a low delay type, and a positioning request of a high accuracy type. The positioning request of the low delay type may be indicated by an information unit. When there is a delay requirement, the information unit is enabled. Further, the low delay is a delay less than a threshold, there may be one or more thresholds, and a quantity of the thresholds determines a low delay indication bit. Further, a low delay request may use a same information element (IE) as the information unit, or may use a different IF. In a case of different IEs, when the information unit is enabled, a low delay indication unit is valid; otherwise, the low delay indication unit is invalid. The positioning request of the high accuracy type may be indicated by an information unit. When there is an accuracy requirement, the information unit is enabled, and the information unit may be the same as or different from the low delay information unit. Further, the high accuracy means that positioning accuracy is greater than a threshold, and the positioning accuracy is generally proximity between spatial entity location information (such as coordinates) and a real location. There may be one or more thresholds for the high accuracy, and a quantity of the thresholds determines a high accuracy indication bit. Further, a high accuracy positioning request may use a same IE as the information unit, or may use a different IE. In a case of different IEs, when the information unit is enabled, a high accuracy indication unit is valid; otherwise, the high accuracy indication unit is invalid.

The response delay information is information related to a positioning delay requirement of the target terminal, such as a specific delay time or a delay range of the request. The accuracy information is information related to a positioning accuracy requirement of the target terminal, such as a specific accuracy value or an accuracy range of the requirement.

The positioning capability information includes at least one of the following: a measurement capability, a mode capability, an inter-frequency measurement capability, and a delay measurement capability.

Specifically, in a case in which the positioning request includes the positioning request type information, in this embodiment, that the positioning information may be determined based on a positioning request includes: the positioning assistance data information is determined based on a type of the positioning request, where different positioning request type information corresponds to different positioning assistance data information. For example, when the type of the positioning request is the low delay type, to satisfy a low-delay requirement, the network device configures a priority of the positioning signal in the positioning assistance data information as a high priority, or configures the measurement time information for the positioning signal, or configures an aperiodic positioning signal, or configures N groups of default or preconfigured configuration information, so that a positioning service satisfies the low-delay requirement.

Optionally, the network device may determine and send the positioning information based on a low-delay positioning assistance data request sent by the terminal, or autonomously determine and send the positioning information; or the network device sends, based on a low-delay positioning request for the terminal by an entity in the core network or the MME or the AMF or an evolution thereof, positioning information that satisfies the low-delay requirement to the terminal; or the terminal or another terminal sends a low-delay positioning request to the network device through the non-access stratum, and the network device sends positioning information that satisfies the low-delay requirement to the terminal.

The positioning information may be positioning assistance data information, or may be measurement request information or other positioning configuration information, or an effective combination of the positioning assistance data information, measurement request information, and the like.

Specifically, the positioning information includes but is not limited to at least one of the following:
configuration information of a positioning signal with a target priority;
configuration information of a positioning signal configured based on a geographical location;
configuration information related to cancellation of repeated signal transmission;
configuration information related to cancellation of a measurement gap;
configuration information related to reduction of a quantity of measurements;
the measurement time information;
configuration information of a default positioning signal;
configuration information of a preconfigured positioning signal; and
configuration information of an aperiodic positioning signal.

Optionally, the sending the positioning information to the terminal includes: sending the measurement result request for the positioning signal to the terminal, where the measurement result request includes the measurement time information of the positioning signal. In this embodiment, the measurement time information of the positioning signal is carried in the measurement result request sent by the network device. In addition to the measurement time information, the measurement result request may also include but is not limited to a multipath RSTD, a maximum quantity of neighboring cell measurements, and a motion information measurement request.

Optionally, the measurement time information includes configuration information of a measurement timer. The network device configures a measurement timer for the terminal. Based on expiration of the measurement timer, the terminal reports a signal measurement result obtained at a current time point.

The configuration information of the measurement timer includes at least one of the following:

start time information of the measurement timer; and timing time information of the measurement timer.

A value or duration of the measurement timer is related to a delay requirement of the positioning service. A timing time of the measurement timer is determined based on a delay-related function, for example, timing time=f (delay, SFN0 OFFSET); or a timing time of the measurement timer is a fixed value, such as 0.1 ms, 0.5 ms, 1 ms, 4 ms, 5 ms, or 10 ms, or a timing time related to a numerology, such as $2^u*(0.1, 0.5, 1, 4, 5, 10)$ ms; or a timing time of the measurement timer is several slots.

It should be noted that a configuration mode of the measurement timer includes but is not limited to the following configuration modes:
  (1) preconfiguration: starting or stopping the measurement timer based on a configured time of the positioning signal;
  (2) implicit configuration: when a first positioning signal is measured, starting or stopping the measurement timer; and
  (3) explicit configuration: configuring a parameter related to starting or stopping the measurement timer, for example, a slot or symbol offset parameter.

Specifically, a start time of the measurement timer may be one of the following:
  (a) an offset relative to a system frame number or a slot number of a serving cell or base station;
  (b) a time offset relative to a reference resource set or a target resource set, where the time offset relative to the target resource set may be an offset of a start position of a resource set specified based on a requirement;
  (c) a time offset relative to the positioning signal, which may be an offset relative to a start measurement time of the first positioning signal;
  (d) an offset relative to a start time of a first resource set; and
  (e) absolute time information.

Optionally, the measurement time information includes configuration information of at least one measurement time window. The network device configures a signal measurement time window for the terminal, and the terminal measures the signal only in the measurement time window.

The configuration information of the at least one measurement time window includes duration information of the at least one measurement time window.

The duration information of the at least one measurement time window may be determined based on the delay-related function, for example, duration information of the at least one measurement time window=f (delay, SFN0 OFFSET); or the duration information of the first measurement time window is a fixed value, such as 0.1 ms, 0.5 ms, 1 ms, 4 ms, 5 ms, or 10 ms; or the duration information of the at least one measurement time window is a value related to the numerology, such as $2^u*(0.1, 0.5, 1, 4, 5, 10)$ ms; or a timing time of the measurement timer is several slots. It should be noted that delays corresponding to different measurement time windows may be the same or different, and corresponding calculation functions may be the same or different, and corresponding fixed values may be the same or different.

Specifically, a period of the at least one measurement time window may be longer than or equal to a period of the positioning signal. The duration of the at least one measurement time window may be shorter than or equal to the period of the positioning signal. The duration of the at least one measurement time window is shorter than or equal to a delay. The delay may be a delay when the terminal is requested to return the result, or may be a measurement delay, or may be a measurement delay estimated based on the result requested to be returned.

The configuration information of the at least one measurement time window may further include start time information of the at least one measurement time window. The start time may be determined based on one of the following: an offset relative to a system frame number or a slot number of a serving cell or base station; a time offset relative to a reference resource set or a target resource set; a time offset relative to the positioning signal; an offset relative to a start time of a first resource set; and absolute time information.

The configuration information of the at least one measurement time window may further include end time information of the at least one measurement time window; and specify an end time of the measurement or reporting by the terminal. It should be noted that the at least one measurement time window is the same for a same positioning frequency layer, that is, the at least one measurement time window may be configured in a parameter of a positioning frequency layer.

A configuration mode of the at least one measurement time window includes but is not limited to the following configuration modes:
  (1) preconfiguration: configuring the start time and end time of the at least one measurement time window based on a configured time of the positioning signal;
  (2) implicit configuration: a time when the first positioning signal is measured is the start or end time of the at least one measurement time window; and
  (3) explicit configuration: configuring a parameter related to starting or ending of the at least one measurement time window.

The following describes content of the configuration information of the measurement time window by using an example in which the measurement time information includes configuration information of a first measurement time window and configuration information of a second measurement time window.

In this embodiment, the first measurement time window may be used for a measurement in an idle state, and a configured period thereof is relatively long; and the second measurement time window is used for a measurement in a connected state, and a configured period thereof is relatively short and needs to be shorter than that of the first measurement time window. The period of the second measurement time window may be shorter than the period of the first measurement time window; a time offset of a start position of the second measurement time window may be consistent with a time offset of a start position of the first measurement time window; or a parameter of an offset relative to the start of the first measurement time window is configured; duration of the second measurement time window may be shorter than or equal to duration of the first measurement time window; and the period and/or duration of the second measurement time window may be related to at least one of a repetition factor and a repetition interval of the configuration information of the positioning signal.

In a case in which the measurement time information includes configuration information of a plurality of measurement time windows, the terminal determines the positioning signal within an overlapping area of the plurality of measurement time windows. Assuming that the measurement time information includes configuration information of the first measurement time window and configuration information of the second measurement time window, when the terminal needs to measure a PRS, the terminal measures the PRS only within an overlapping area of the first measurement time window and the second measurement time window; and when the terminal needs to send an SRS, the terminal sends the SRS only within the overlapping area of the first measurement time window and the second measurement time window.

Optionally, the priority information related to the positioning signal includes priority information of the positioning signal; and a time-frequency resource corresponding to a positioning signal with a target priority satisfies al least one of the following conditions:
- the time-frequency resource corresponding to the positioning signal with the target priority is allowed to be occupied by a data service whose priority is the target priority;
- the time-frequency resource corresponding to the positioning signal with the target priority is not allowed to be occupied by a data service whose priority is lower than the target priority; and
- the time-frequency resource corresponding to the positioning signal with the target priority is not allowed to be occupied by a signal whose priority is lower than the target priority.

In this embodiment, to ensure timely completion of positioning, for a time-frequency resource of a high-priority positioning signal, transmission of another PDSCH or PUCCH or RS signal is not expected. In addition, the time-frequency resource of the high-priority positioning signal may be occupied by a high-priority data service.

Optionally, the network device configures the configuration information of the positioning signal based on the positioning request, and the configuration information of the positioning signal may be the configuration information of the positioning signal with the target priority, that is, when the network device configures the positioning signal for the terminal, the positioning signal is configured as a high-priority positioning signal; or the configuration information of the positioning signal is configuration information of an aperiodic positioning signal; or the configuration information of the positioning signal is configuration information of a default or special positioning signal. For example, when the network device configures the positioning signal for the terminal, the positioning signal is configured as a high-priority positioning signal. Further, a quantity of orthogonal frequency division multiplexing OFDM symbols of the positioning signal is 1 or 2; and/or the positioning signal supports a cyclic shift greater than 12, such as 16, 24, and 48. Further, the following positioning information is configured: configuration information of a positioning signal configured based on a geographical location; or configuration information related to cancellation of repeated signal transmission; or configuration information related to cancellation of a measurement gap; or configuration information related to reduction of a quantity of measurements; or configuration information of a default positioning signal; or configuration information of a preconfigured positioning signal; or configuration information of an aperiodic positioning signal.

In a case in which the positioning information includes the priority information related to the positioning signal, after validity of a positioning signal with a target priority expires, the method may further include: configuring priority information of the positioning signal as a default configuration or another configuration. Alternatively, after validity configured for the positioning information expires, the method may further include: configuring the positioning information as a default configuration or another configuration. The another configuration may be configuration information for which no priority is set, or periodic or semi-static configuration information.

In this embodiment, because there is a case in which the time-frequency resource of the positioning signal with the target priority is not allowed to be occupied by a data service or signal whose priority is lower than the target priority, the terminal for which a high-priority positioning signal is configured does not expect to process a low-priority positioning signal at the same time. To avoid impact on transmission of other signals, a validity period may be configured for the target priority of the positioning signal. After the validity period of the target priority expires, the default configuration may be restored, or a configuration of the positioning signal before the priority information is configured may be restored, so that the other signals can be transmitted normally. If there is still a requirement for low-delay positioning, the priority of the positioning signal may be reconfigured.

Optionally, the sending the positioning information to the terminal includes: sending, to the terminal, the priority information related to the positioning signal, where the priority information related to the positioning signal includes priority information of a measurement result request.

A time-frequency resource corresponding to a measurement result request with a target priority satisfies at least one of the following conditions:
- the time-frequency resource corresponding to the measurement result request with the target priority is allowed to be occupied by a data service whose priority is the target priority;
- the time-frequency resource corresponding to the measurement result request with the target priority is not allowed to be occupied by a data service whose priority is lower than the target priority; and
- the time-frequency resource corresponding to the measurement result request with the target priority is not allowed to be occupied by a signal whose priority is lower than the target priority.

In this embodiment, the measurement result request with the target priority may be a measurement result request with a high priority, such as a first priority. To ensure timely reporting of the measurement result, for requesting or reporting of the positioning result with the high priority, transmission of another PDSCH or PUCCH or reference signal is not expected. The time-frequency resource for requesting or reporting the positioning result with the high priority may be occupied by a high-priority data service. Optionally, the measurement result request may further include repetition information of the measurement result.

Optionally, the method further includes: receiving a measurement result of the positioning signal, where the measurement result includes a type of the measurement result and/or priority information of the measurement result.

After receiving the measurement result request, the terminal measures the positioning signal, and feeds back the measurement result to the network device. The type of the measurement result may indicate whether the measurement result is a low-delay measurement result or an eMBB measurement result.

Optionally, in a case in which the measurement result includes the type of the measurement result, the type of the measurement result is indicated by using at least one of the following manners: an indication identifier of a measurement result related to a delay; an indication identifier of a measurement result related to applying a target positioning signal, where the target positioning assistance data may be a low-delay or high-priority or preconfigured positioning assistance data; an indication identifier of a measurement result of measuring a target positioning signal, where the target positioning signal may be a low-delay or high-priority positioning signal; an indication identifier of a measurement result reported with reference to a motion sensor; and the type of the measurement result indicated by using a new information element IE, where for example, the type of the measurement result is distinguished by using a measurement time.

Optionally, before the measurement result of the positioning signal is received, to reduce a reporting waiting time, an uplink resource for reporting information by the terminal further needs to be determined. The method further includes: receiving an uplink resource request; and the uplink resource request includes at least one of the following:
a reason for the uplink resource request;
a type of the uplink resource request, where the type includes: periodic, aperiodic, or semi-static;
a resource size; and
priority information of the uplink resource request.

The network device receives the uplink resource request sent by the terminal, determines an uplink resource based on content of the request, and sends uplink resource configuration information to the terminal. Assuming that the network device is the E-SMLC or the LMF, the E-SMLC or the LMF may configure an uplink resource based on the configuration information of the positioning signal, and send uplink resource configuration information to the terminal and the base station; or as prescribed by a protocol, the E-SMLC or the LMF sends uplink resource configuration information to the terminal and the base station according to the protocol and information preconfigured by a higher layer.

Optionally, the sending the positioning information to the terminal includes: sending the uplink resource configuration information. The uplink resource configuration information may be determined in one of the following manners:

The uplink resource configuration information is determined based on the configuration information of the positioning signal and/or the measurement time information of the positioning signal. Specifically, a configuration mode includes but is not limited to: configuring a grant, configuring a UL grant, a dynamic configuration of DCI, an RRC preconfiguration, and an LPP preconfiguration.

The uplink resource configuration information is determined based on the uplink resource request. If the terminal has sent the uplink resource request, the network device may configure the uplink resource configuration information based on the uplink resource request. Specifically, a configuration mode includes but is not limited to configuring a grant, configuring a UL grant, a dynamic configuration of DCI, an RRC preconfiguration, and an LPP preconfiguration.

The uplink resource configuration information is determined based on a protocol or information preconfigured by a higher layer. Based on an uplink resource of the positioning signal specified in the protocol, the E-SMLC or the LMF may send configuration information of the uplink resource to the terminal and the serving cell.

In this embodiment, before the terminal reports the measurement result, the network device configures the uplink resource configuration information for the terminal. In this way, the reporting waiting time is saved, the terminal can complete reporting of the measurement information in time, and a requirement for a low positioning delay can be satisfied.

Optionally, the positioning request triggers a configuration of an aperiodic positioning reference signal PRS. Optionally, the aperiodic PRS is a PRS with a target priority. Assuming that the target priority is a high priority, the aperiodic PRS is configured as a high-priority PRS, and for a time-frequency resource of the high-priority PRS, transmission of another PDSCH or PUCCH or SRS or PRS is not expected.

A configuration mode of the aperiodic PRS may be a preconfiguration or a default configuration. Optionally, the method further includes:
receiving an aperiodic PRS request; and
sending an aperiodic PRS to the terminal based on the aperiodic PRS request.

The terminal sends the aperiodic PRS request to the network device; the network device receives the aperiodic PRS request, and sends the aperiodic PRS in a time-domain position related to a cell location of the network device, so that the terminal measures the PRS; the terminal receives the aperiodic PRS, and measures the PRS based on measurement time information in configuration information of the PRS, or measures the PRS based on configuration information of a target priority of the PRS. Optionally, the terminal may directly measure the PRS in a preconfigured time window based on the measurement time information of the PRS; or the E-SMLC or the LMF receives a high-priority service request sent by the terminal, and switches the configuration information of the PRS to a high priority, so that the terminal measures the PRS based on the high-priority configuration information.

Alternatively, a configuration mode of the aperiodic PRS may be: the LMF preconfigures the PRS based on the request of the terminal, where the aperiodic PRS overlaps a periodic PRS, and the periodic PRS is dropped; or the aperiodic PRS overlaps low-priority data, and the low-priority data is dropped.

Alternatively, a configuration mode of the aperiodic PRS may be: the LMF directly configures the aperiodic PRS based on the positioning request. The configuration information is configured for the terminal by using LPP (or NRPP or an evolution thereof), and is configured for the related cell or base station by using LPPA (or NRPPA or an evolution thereof), where the aperiodic PRS overlaps a periodic PRS, and the periodic PRS is dropped; or the aperiodic PRS overlaps low-priority data, and the low-priority data is dropped.

Alternatively, a configuration mode of the aperiodic PRS may be: the UE or the LMF activates the configuration of the aperiodic PRS by using activation signaling.

In addition, upon expiration of the configuration of the aperiodic PRS, a default configuration or an original configuration or a configuration of the periodic PRS is restored.

Optionally, the positioning request triggers a configuration of an aperiodic sounding reference signal SRS with a target priority. The aperiodic SRS is configured as a high-priority SRS, and for a time-frequency resource of the SRS, transmission of another PDSCH or PUCCH or SRS or PRS is not expected. A configuration mode of the aperiodic SRS is a preconfiguration or a dynamic configuration.

The aperiodic sounding reference signal SRS with the target priority may be activated by using DCI, or may be activated by using a combination of a preconfiguration and DCI, or is preconfigured and specified by a protocol.

Specifically, after determining the positioning signal based on the positioning information, the terminal sends the SRS to the network device; and the network device receives the aperiodic SRS, and measures the SRS based on measurement time information in configuration information of the SRS, or measures the SRS based on configuration information of a target priority of the SRS. There may be an interval time T between a sending time of the SRS and the positioning request, or a sending time of the SRS may be configured by an information unit explicitly or prescribed by a protocol.

It should be noted that all descriptions of the network device in the foregoing embodiment applied to the terminal are applicable to the embodiment of the positioning method applied to the network device, with the same technical effects achieved.

In this embodiment of the present invention, the network device adds the priority information related to the positioning signal and/or the measurement time information of the positioning signal to the determined positioning information based on the positioning request. Therefore, a high-priority positioning signal can be sent or measured preferentially, or the terminal or the base station can complete the measurement of the positioning signal and reporting of the measurement result within a constrained time range. In this way, it can be ensured that the positioning is completed within a predetermined time, and a requirement for a low positioning delay can be satisfied.

Figure 6:
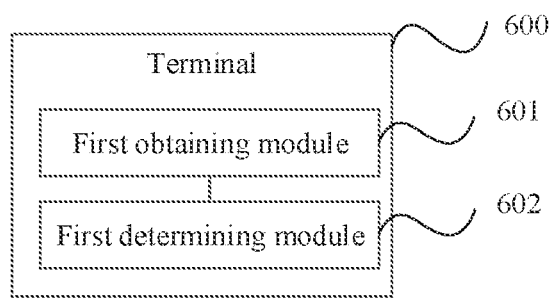
FIG. 6 is a schematic modular diagram of a terminal according to an embodiment of the present invention.

As shown in FIG. 6, an embodiment of the present invention provides a terminal 600, including:
- a first obtaining module 601, configured to obtain positioning information, where the positioning information includes priority information related to a positioning signal, and/or measurement time information of a positioning signal; and
- a first determining module 602, configured to determine the positioning signal based on the positioning information.

Optionally, the terminal further includes:
- a second sending module, configured to send a positioning request, where the positioning request includes a request for positioning the terminal, and/or a positioning assistance data request.

Optionally, the positioning request further includes at least one of the following: positioning request type information, positioning capability information, response delay information, and accuracy information.

Optionally, the positioning capability information includes at least one of the following: a measurement capability, a mode capability, an inter-frequency measurement capability, and a delay measurement capability.

Optionally, the positioning information includes at least one of the following:
- configuration information of a positioning signal with a target priority;
- configuration information of a positioning signal configured based on a geographical location;
- configuration information related to cancellation of repeated signal transmission;
- configuration information related to cancellation of a measurement gap;
- configuration information related to reduction of a quantity of measurements;
- configuration information of a default positioning signal;
- configuration information of a preconfigured positioning signal;
- configuration information of an aperiodic positioning signal; and
- measurement time information.

Optionally, the measurement time information includes configuration information of a measurement timer; and
the configuration information of the measurement timer includes at least one of the following:
start time information of the measurement timer; and
timing time information of the measurement timer, where a timing time of the measurement tinier is determined based on a delay-related function, or a timing time of the measurement timer is a fixed value.

Optionally, the measurement time information includes configuration information of at least one measurement time window; and
the configuration information of the at least one measurement time window includes duration information of the at least one measurement time window.

Optionally, the configuration information of the at least one measurement time window further includes start time information of the at least one measurement time window; and
the start time is determined based on one of the following:
an offset relative to a system frame number or a slot number of a serving cell or base station;
a time offset relative to a reference resource set or a target resource set;
a time offset relative to the positioning signal;
an offset relative to a start time of a first resource set; and
absolute time information.

Optionally, in a case in which the measurement time information includes configuration information of a plurality of measurement time windows, the first determining module 602 is specifically configured to determine the positioning signal within an overlapping area of the plurality of measurement time windows.

Optionally, the priority information related to the positioning signal includes priority information of the positioning signal; and a time-frequency resource corresponding to a positioning signal with a target priority satisfies at least one of the following conditions:
the time-frequency resource corresponding to the positioning signal with the target priority is allowed to be occupied by a data service whose priority is the target priority;
the time-frequency resource corresponding to the positioning signal with the target priority is not allowed to be occupied by a data service whose priority is lower than the target priority; and
the time-frequency resource corresponding to the positioning signal with the target priority is not allowed to be occupied by a signal whose priority is lower than the target priority.

Optionally, the positioning information includes configuration information of the positioning signal, and the configuration information of the positioning signal includes at least one of the following:
a quantity of orthogonal frequency division multiplexing OFDM symbols of the positioning signal is 1 or 2; and
the positioning signal supports a cyclic shift greater than 12.

Optionally, in a case in which the positioning information includes the priority information related to the positioning signal, after validity of a positioning signal with a target priority expires, a default configuration or another configuration is restored.

Optionally, the priority information related to the positioning signal includes priority information of a measurement result request; and
> a time-frequency resource corresponding to a measurement result request with a target priority satisfies at least one of the following conditions:
> the time-frequency resource corresponding to the measurement result request with the target priority is allowed to be occupied by a data service whose priority is the target priority;
> the time-frequency resource corresponding to the measurement result request with the target priority is not allowed to be occupied by a data service whose priority is lower than the target priority; and
> the time-frequency resource corresponding to the measurement result request with the target priority is not allowed to be occupied by a signal whose priority is lower than the target priority.

Optionally, the terminal further includes:
a third sending module, configured to send a measurement result of the positioning signal, where the measurement result includes a type of the measurement result and/or priority information of the measurement result.

Optionally, the type of the measurement result is indicated by using at least one of the following manners:
> an indication identifier of a measurement result related to a delay;
> an indication identifier of a measurement result related to applying a target positioning signal;
> an indication identifier of a measurement result of measuring a target positioning signal;
> an indication identifier of a measurement result reported with reference to a motion sensor; and
> the type of the measurement result indicated by using a new information element.

Optionally, the terminal further includes a fourth sending module, configured to send an uplink resource request, where
> the uplink resource request includes at least one of the following:
> a reason for the uplink resource request;
> a type of the uplink resource request, where the type includes: periodic, aperiodic, or semi-static;
> a resource size; and
> priority information of the uplink resource request.

Optionally, the positioning information includes uplink resource configuration information.

Optionally, a configuration mode of the uplink resource configuration information includes one of the following:
> the uplink resource configuration information is configured based on configuration information of the positioning signal and/or the measurement time information of the positioning signal;
> the uplink resource configuration information is configured based on the uplink resource request; and
> the uplink resource configuration information is preconfigured by a protocol or a higher layer.

Optionally, the first determining module 602 is specifically configured to: determine a to-be-measured positioning signal based on the positioning information; or determine a to-be-sent positioning signal based on the positioning information.

Optionally, the positioning signal is an aperiodic positioning reference signal PRS; and the terminal further includes:
a first measurement module, configured to measure the PRS based on measurement time information in configuration information of the PRS, or measure the PRS based on configuration information of a target priority of the PRS.

Optionally, the positioning signal is an aperiodic sounding reference signal SRS with a target priority; and the terminal further includes:
a sixth sending module, configured to send the aperiodic sounding reference signal SRS to a network device based on the positioning information.

It should be noted that this terminal embodiment is the terminal corresponding to the foregoing positioning method applied to the terminal. All implementations in the foregoing embodiment are applicable to this terminal embodiment, with the same technical effects achieved.

In this embodiment of the present invention, the priority information related to the positioning signal and/or the measurement time information of the positioning signal are/is added to the positioning information. Therefore, a high-priority positioning signal can be sent or measured preferentially, or the terminal can complete the measurement of the positioning signal and reporting of the measurement result within a constrained time range. In this way, it can be ensured that the positioning is completed within a predetermined time, and a requirement for a low positioning delay can be satisfied.

Figure 7:
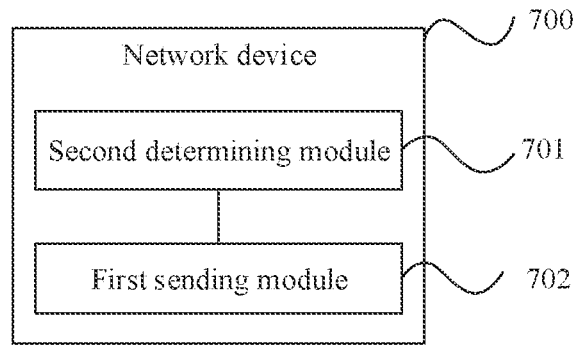
FIG. 7 is a schematic modular diagram of a network device according to an embodiment of the present invention.

As shown in FIG. 7, an embodiment of the present invention provides a network device 700, including:
a second determining module 701, configured to determine positioning information based on the positioning request, where the positioning information includes priority information related to a positioning signal, and/or measurement time information of a positioning signal; and
a first sending module 702, configured to send the positioning information to a terminal.

Optionally, the network device further includes a second obtaining module, configured to obtain a positioning request, where the positioning request includes a request for positioning the terminal, and/or a positioning assistance data request.

Optionally, the positioning request further includes at least one of the following: positioning request type information, positioning capability information, response delay information, and accuracy information.

Optionally, the positioning information includes at least one of the following:
> configuration information of a positioning signal with a target priority;
> configuration information of a positioning signal configured based on a geographical location;
> configuration information related to cancellation of repeated signal transmission;
> configuration information related to cancellation of a measurement gap;
> configuration information related to reduction of a quantity of measurements;
> configuration information of a default positioning signal;
> configuration information of a preconfigured positioning signal;
> configuration information of an aperiodic positioning signal; and
> measurement time information.

Optionally, the measurement time information includes configuration information of a measurement timer; and
the configuration information of the measurement timer includes at least one of the following:
start time information of the measurement timer; and timing time information of the measurement timer, where a timing time of the measurement tinier is determined based on a delay-related function, or a timing time of the measurement timer is a fixed value.

Optionally, the measurement time information is configuration information of a measurement time window:

the measurement time information includes configuration information of at least one measurement time window; and the configuration information of the at least one measurement time window includes duration information of the at least one measurement time window.

Optionally, the priority information related to the positioning signal includes priority information of the positioning signal; and a time-frequency resource corresponding to a positioning signal with a target priority satisfies at least one of the following conditions:

the time-frequency resource corresponding to the positioning signal with the target priority is allowed to be occupied by a data service whose priority is the target priority;

the time-frequency resource corresponding to the positioning signal with the target priority is not allowed to be occupied by a data service whose priority is lower than the target priority; and the time-frequency resource corresponding to the positioning signal with the target priority is not allowed to be occupied by a signal whose priority is lower than the target priority.

Optionally, in a case in which the positioning information includes priority information of the positioning signal, the network device further includes a third determining module, configured to configure the priority information of the positioning signal as a default configuration or another configuration.

Optionally, the network device further includes a second receiving module, configured to receive a measurement result of the positioning signal, where the measurement result includes a type of the measurement result and/or priority information of the measurement result.

Optionally, the network device further includes a third receiving module, configured to receive an uplink resource request, where the uplink resource request includes at least one of the following:

a reason for the uplink resource request;

a type of the uplink resource request, where the type includes: periodic, aperiodic, or semi-static;

a resource size; and priority information of the uplink resource request.

Optionally, the first sending module 702 includes a first sending unit, configured to send uplink resource configuration information.

Optionally, the positioning request triggers a configuration of an aperiodic positioning reference signal PRS.

Optionally, the positioning request triggers a configuration of an aperiodic sounding reference signal SRS with a target priority; and the network device further includes:

a fourth receiving module, configured to receive an aperiodic SRS; and a second measurement module, configured to measure the SRS based on measurement time information in configuration information of the SRS, or measure the SRS based on configuration information of a target priority of the SRS.

It should be noted that this network device embodiment is the network device corresponding to the foregoing positioning method applied to the network device. All implementations in the foregoing embodiment are applicable to this network device embodiment, with the same technical effects achieved.

In this embodiment of the present invention, the network device adds the priority information related to the positioning signal and/or the measurement time information of the positioning signal to the determined positioning information based on the positioning request. Therefore, a high-priority positioning signal can be sent or measured preferentially, or the terminal or the base station can complete the measurement of the positioning signal and reporting of the measurement result within a constrained time range. In this way, it can be ensured that the positioning is completed within a predetermined time, and a requirement for a low positioning delay can be satisfied.

Figure 8:
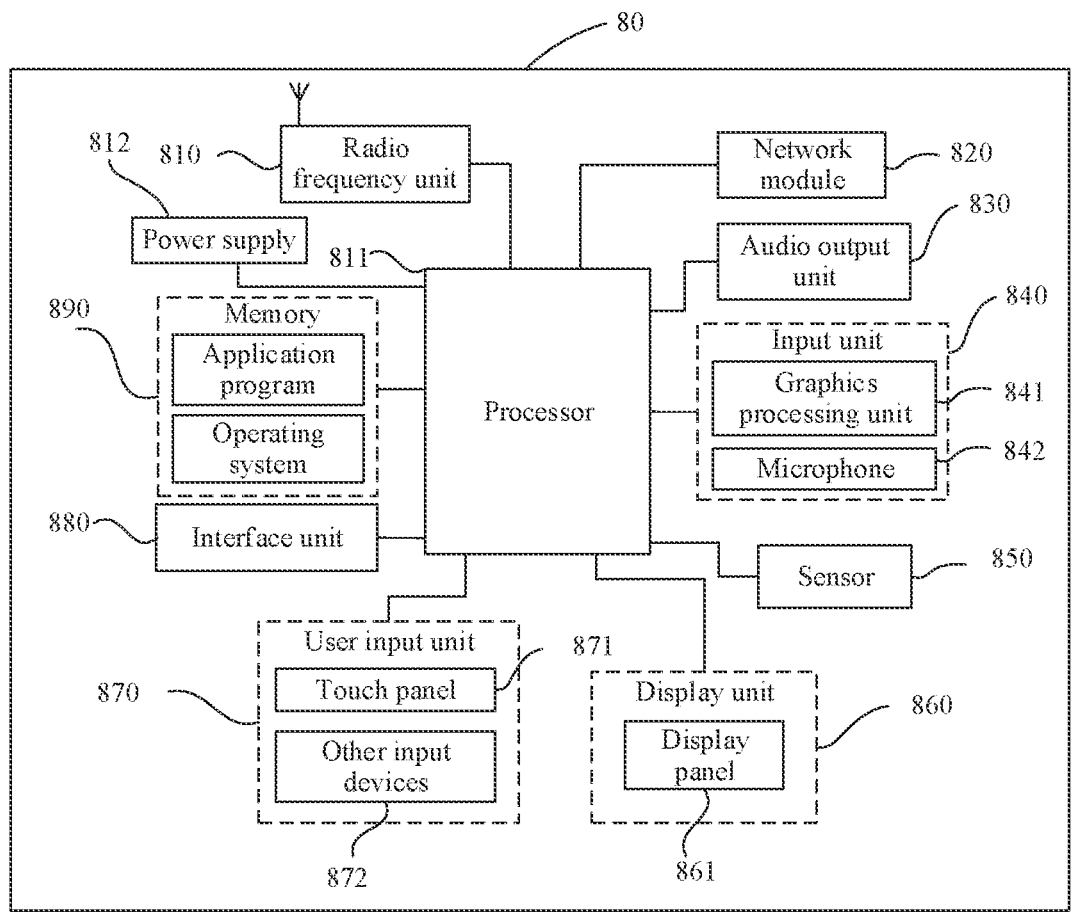
FIG. 8 is a structural block diagram of a terminal according to an embodiment of the present invention.

FIG. 8 is a schematic diagram of a hardware structure of a terminal for implementing an embodiment of the present invention.

The terminal 80 includes but is not limited to components such as a radio frequency unit 810, a network module 820, an audio output unit 830, an input unit 840, a sensor 850, a display unit 860, a user input unit 870, an interface unit 880, a memory 890, a processor 811, and a power supply 812. A person skilled in the art may understand that the structure of the terminal shown in FIG. 8 does not constitute any limitation on the terminal. The terminal may include more or fewer components than those shown in the figure, or a combination of some components, or the components disposed differently. In this embodiment of the present invention, the terminal includes but is not limited to a mobile phone, a tablet computer, a notebook computer, a palmtop computer, a vehicle-mounted terminal, a wearable device, a pedometer, or the like.

The processor 811 is configured to obtain positioning information, where the positioning information includes priority information related to a positioning signal, and/or measurement time information of a positioning signal; and determine the positioning signal based on the positioning information.

It should be understood that in this embodiment of the present invention, the radio frequency unit 810 may be configured to receive and send signals in an information reception or transmission or call process. Specifically, after receiving downlink data from a network-side device, the radio frequency unit 810 sends the downlink data to the processor 811 for processing, and in addition, sends uplink data to the network-side device. Generally, the radio frequency unit 810 includes but is not limited to an antenna, at least one amplifier, a transceiver, a coupler, a low noise amplifier, a duplexer, and the like. In addition, the radio frequency unit 810 may also communicate with a network and other devices via a wireless communications system.

The terminal provides a user with wireless broadband internet access through the network module 820, for example, helping the user transmit and receive e-mails, browse web pages, and access streaming media.

The audio output unit 830 may convert audio data received by the radio frequency unit 810 or the network module 820 or stored in the memory 890 into an audio signal and output the audio signal as a sound. Furthermore, the audio output unit 830 may also provide audio output (for example, a call signal received sound or a message received sound) related to a specific function performed by the terminal 80. The audio output unit 830 includes a speaker, a buzzer, a receiver, and the like.

The input unit 840 is configured to receive an audio or video signal. The input unit 840 may include a graphics processing unit (GPU) 841 and a microphone 842. The graphics processing unit 841 processes image data of a still picture or video obtained by an image capture apparatus (such as a camera) in a video capture mode or an image capture mode. A processed image frame may be displayed on the display unit 860. The image frame processed by the graphics processing unit 841 may be stored in the memory 890 (or another storage medium) or be sent by the radio frequency unit 810 or the network module 820. The microphone 842 is capable of receiving sounds and processing such sounds into audio data. The processed audio data may be converted in a telephone call mode into a format that can be sent to the network-side device through the radio frequency unit 810, for outputting.

The terminal 80 further includes at least one sensor 850, for example, an optical sensor, a motion sensor, and another sensor. Specifically, the optical sensor includes an ambient light sensor and a proximity sensor. The ambient light sensor may adjust luminance of the display panel 861 based on brightness of ambient light, and the proximity sensor may turn off the display panel 861 and/or backlight when the terminal 80 moves close to an ear. As a type of motion sensor, an accelerometer sensor can detect magnitudes of accelerations in all directions (usually three axes), can detect a magnitude and a direction of gravity when the terminal is in a static state, and can be applied to posture recognition (such as screen switching between portrait and landscape, related games, and magnetometer posture calibration) of the terminal, functions related to vibration recognition (such as pedometer and tapping), and the like. The sensor 850 may also include a fingerprint sensor, a pressure sensor, an iris sensor, a molecular sensor, a gyroscope, a barometer, a hygrometer, a thermometer, an infrared sensor, and the like. Details are not described herein again.

The display unit 860 is configured to display information input by the user or information provided to the user. The display unit 860 may include a display panel 861, and the display panel 861 may be configured in a form of a liquid crystal display (LCD), an organic light-emitting diode (OLED), or the like.

The user input unit 870 may be configured to receive input digit or character information and generate a key signal input related to user setting and function control of the terminal. Specifically, the user input unit 870 includes a touch panel 871 and other input devices 872. The touch panel 871 is also referred to as a touchscreen and can collect a touch operation (such as an operation performed by the user on the touch panel 871 or near the touch panel 871 with a finger or by using any proper object or accessory such as a stylus) of the user on or near the touch panel 871. The touch panel 871 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 811, and receives a command sent by the processor 811 and executes the command. In addition, the touch panel 871 may be implemented in a plurality of forms, for example, a resistive, capacitive, infrared, or surface acoustic wave touch panel. The user input unit 870 may further include the other input devices 872 in addition to the touch panel 871. Specifically, the other input devices 872 may include but are not limited to a physical keyboard, a function key (such as a volume control key or a switch key), a trackball, a mouse, and a joystick. Details are not described herein again.

Further, the touch panel 871 may cover the display panel 861. When detecting a touch operation on or near the touch panel 871, the touch panel 871 transmits the touch operation to the processor 811 to determine a type of a touch event. Then, the processor 811 provides a corresponding visual output on the display panel 861 based on the type of the touch event. Although in FIG. 8, the touch panel 871 and the display panel 861 act as two independent parts to implement input and output functions of the terminal, in some embodiments, the touch panel 871 and the display panel 861 may be integrated to implement the input and output functions of the terminal. This is not specifically limited herein.

The interface unit 880 is an interface between an external apparatus and the terminal 80. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 880 may be configured to receive an input (for example, data information or power) from an external apparatus and transmit the received input to one or more elements within the terminal 80, or may be configured to transmit data between the terminal 80 and the external apparatus.

The memory 890 may be configured to store software programs and various data. The memory 890 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 840 may include a high-speed random access memory, and may further include a non-volatile memory such as a disk storage device, a flash memory device, or another volatile solid-state storage device.

The processor 811 is a control center of the terminal, and is connected to all components of the terminal by using various interfaces and lines. By running or executing a software program and/or module that is stored in the memory 890 and calling data stored in the memory 890, the processor 811 executes various functions of the terminal and processes data, so as to perform overall monitoring on the terminal. The processor 811 may include one or more processing units. Preferably, the processor 811 may integrate an application processor and a modem processor. The application processor mainly processes the operating system, a user interface, an application program, and the like. The modem processor mainly processes wireless communication. It can be understood that the modem processor may alternatively be not integrated in the processor 811.

The terminal 80 may further include the power supply 812 (such as a battery) supplying power to each component. Preferably, the power supply 812 may be logically connected to the processor 811 by using a power management system, so that functions such as charge and discharge management and power consumption management are implemented by using the power management system.

In addition, the terminal 80 includes some functional modules that are not shown. Details are not described herein again.

Preferably, an embodiment of the present invention further provides a terminal, including a processor 811, a memory 890, and a computer program stored in the memory 890 and capable of running on the processor 811. When the computer program is executed by the processor 811, each process of the foregoing positioning method embodiment applied to the terminal is implemented, with the same technical effects achieved. To avoid repetition, details are not described herein again.

An embodiment of the present invention further provides a computer-readable storage medium, where a computer program is stored in the computer-readable storage medium. When the computer program is executed by a processor, each process of the foregoing positioning method embodiment applied to the terminal is implemented, with the same technical effects achieved. To avoid repetition, details are not described herein again. The computer-readable storage medium is, for example, a read-only memory (ROM), a random access memory (RAM), a magnetic disk, or an optical disc.

Figure 9:
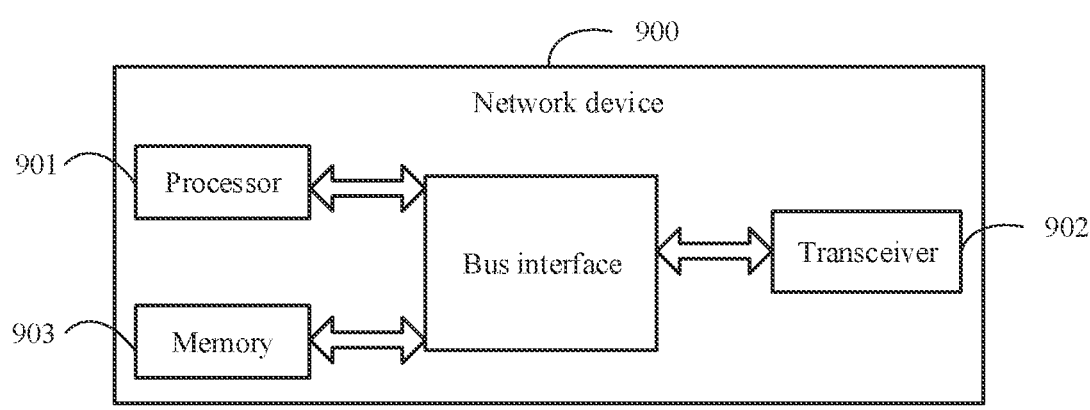
FIG. 9 is a structural block diagram of a network device according to an embodiment of the present invention.

FIG. 9 is a structural diagram of a network device according to an embodiment of the present invention. The network device can implement details of the foregoing positioning method, with the same effect achieved. As shown in FIG. 9, the network device 900 includes a processor 901, a transceiver 902, a memory 903, and a bus interface.

The processor 901 is configured to read a program in the memory 903 to perform the following process:

determining positioning information, where the positioning information includes priority information related to a positioning signal, and/or measurement time information of a positioning signal; and sending the positioning information to a terminal.

In FIG. 9, a bus architecture may include any quantity of interconnected buses and bridges, and specifically connects together circuits that are of one or more processors represented by the processor 901 and of a memory represented by the memory 903. The bus architecture may further interconnect various other circuits such as a peripheral device, a voltage regulator, and a power management circuit. These are all well known in the art, and therefore are not further described in this specification. The bus interface provides an interface. The transceiver 902 may be a plurality of components, including a transmitter and a receiver, and provides units for communicating with a variety of other apparatuses on a transmission medium.

Optionally, the processor 901 is further configured to obtain a positioning request, where the positioning request includes a request for positioning the terminal, and/or a positioning assistance data request.

Optionally, the positioning request further includes at least one of the following: positioning request type information, positioning capability information, response delay information, and accuracy information.

Optionally, the positioning information includes at least one of the following:

configuration information of a positioning signal with a target priority;

configuration information of a positioning signal configured based on a geographical location;

configuration information related to cancellation of repeated signal transmission;

configuration information related to cancellation of a measurement gap;

configuration information related to reduction of a quantity of measurements;

configuration information of a default positioning signal;

configuration information of a preconfigured positioning signal;

configuration information of an aperiodic positioning signal; and measurement time information.

Optionally, the measurement time information includes configuration information of a measurement timer; and the configuration information of the measurement timer includes at least one of the following:

start time information of the measurement timer; and timing time information of the measurement timer, where a timing time of the measurement timer is determined based on a delay-related function, or a timing time of the measurement timer is a fixed value.

Optionally, the measurement time information includes configuration information of at least one measurement time window; and the configuration information of the at least one measurement time window includes duration information of the at least one measurement time window.

Optionally, the priority information related to the positioning signal includes priority information of the positioning signal; and a time-frequency resource corresponding to a positioning signal with a target priority satisfies at least one of the following conditions:

the time-frequency resource corresponding to the positioning signal with the target priority is allowed to be occupied by a data service whose priority is the target priority;

the time-frequency resource corresponding to the positioning signal with the target priority is not allowed to be occupied by a data service whose priority is lower than the target priority; and the time-frequency resource corresponding to the positioning signal with the target priority is not allowed to be occupied by a signal whose priority is lower than the target priority.

Optionally, in a case in which the positioning information includes priority information of the positioning signal, the processor 901 is further configured to configure the priority information of the positioning signal as a default configuration or another configuration.

Optionally, the processor 901 is further configured to receive a measurement result of the positioning signal, where the measurement result includes a type of the measurement result and/or priority information of the measurement result.

Optionally, the processor 901 is further configured to receive an uplink resource request, where the uplink resource request includes at least one of the following:

a reason for the uplink resource request;

a type of the uplink resource request, where the type includes: periodic, aperiodic, or semi-static;

a resource size; and priority information of the uplink resource request.

Optionally, when sending the positioning information to the terminal, the processor 901 is specifically configured to send uplink resource configuration information.

Optionally, the positioning request triggers a configuration of an aperiodic positioning reference signal PRS.

Optionally, the positioning request triggers a configuration of an aperiodic sounding reference signal SRS with a target priority; and the processor 901 is further configured to:

receive an aperiodic SRS; and measure the SRS based on measurement time information in configuration information of the SRS, or measure the SRS based on configuration information of a target priority of the SRS.

The network device may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB), a relay station, or an access point in LTE, or may be a base station in a future 5G network, or the like, and is not limited herein.

An embodiment of the present invention further provides a computer-readable storage medium, where a computer program is stored in the computer-readable storage medium. When the computer program is executed by a processor, each process of the foregoing positioning method embodiment applied to the network device is implemented, with the same technical effects achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network-side device, or the like) to perform the method described in the embodiments of the present invention.

The foregoing descriptions are preferred implementations of the present invention. It should be noted that a person of ordinary skill in the art may make several improvements or refinements without departing from the principle of the present invention and the improvements or refinements shall fall within the protection scope of the present invention.

What is claimed is:

1. A positioning method, performed by a terminal and comprising:
    obtaining positioning information, wherein the positioning information comprises priority information related to a positioning signal, and measurement time information of the positioning signal; and
    determining the positioning signal based on the positioning information;
    wherein the determining the positioning signal based on the positioning information comprises:
    measuring a positioning reference signal (PRS) based on measurement time information in configuration information of the PRS and configuration information of a target priority of the PRS;
    wherein, the priority information related to the positioning signal comprises a priority relation between the positioning signal and another signal or between the positioning signal and data service;
    the method further comprises:
    dropping low-priority data, in a case that the positioning signal overlaps the low-priority data.

2. The positioning method according to claim 1, wherein before the obtaining positioning information, the method further comprises:
    sending a positioning request, wherein the positioning request comprises a request for positioning the terminal, and/or a positioning assistance data request.

3. The positioning method according to claim 1, wherein the positioning information comprises at least one of the following:
    configuration information of a positioning signal with a target priority;
    configuration information of a positioning signal configured based on a geographical location;
    configuration information related to cancellation of repeated signal transmission;
    configuration information related to cancellation of a measurement gap;
    configuration information related to reduction of a quantity of measurements;
    configuration information of a default positioning signal;
    configuration information of a preconfigured positioning signal;
    configuration information of an aperiodic positioning signal; and
    measurement time information.

4. The positioning method according to claim 1, wherein the measurement time information is configuration information of at least one measurement time window.

5. The positioning method according to claim 4, wherein the configuration information of the at least one measurement time window further comprises start time information of the at least one measurement time window; and
    the start time is determined based on following:
    an offset relative to a system frame number or a slot number of a serving cell or base station.

6. The positioning method according to claim 4, wherein the configuration information of the at least one measurement time window includes duration information of the at least one measurement time window.

7. The positioning method according to claim 1, wherein the priority information related to the positioning signal comprises priority information of the positioning signal; and
    a time-frequency resource corresponding to a positioning signal with a target priority satisfies at least one of the following conditions:
    the time-frequency resource corresponding to the positioning signal with the target priority is allowed to be occupied by a data service whose priority is the target priority;
    the time-frequency resource corresponding to the positioning signal with the target priority is not allowed to be occupied by a data service whose priority is lower than the target priority; and the time-frequency resource corresponding to the positioning signal with the target priority is not allowed to be occupied by a signal whose priority is lower than the target priority.

8. The positioning method according to claim 1, wherein the positioning information comprises configuration information of the positioning signal, and the configuration information of the positioning signal comprises at least one of the following:
   a quantity of orthogonal frequency division multiplexing (OFDM) symbols of the positioning signal is 1 or 2; and
   the positioning signal supports a cyclic shift greater than 12.

9. The positioning method according to claim 1, wherein in a case in which the positioning information comprises the priority information related to the positioning signal, after validity of a positioning signal with a target priority expires, a default configuration or another configuration is restored.

10. The positioning method according to claim 1, wherein the positioning information comprises uplink resource configuration information;
   wherein a configuration mode of the uplink resource configuration information comprises one of the following:
   the uplink resource configuration information is configured based on configuration information of the positioning signal and/or the measurement time information of the positioning signal;
   the uplink resource configuration information is configured based on an uplink resource request; and
   the uplink resource configuration information is preconfigured by a protocol or a higher layer.

11. The positioning method according to claim 1, wherein the determining the positioning signal based on the positioning information comprises:
   determining a to-be-measured positioning signal based on the positioning information; or
   determining a to-be-sent positioning signal based on the positioning information.

12. The positioning method according to claim 1, wherein the positioning signal is an aperiodic sounding reference signal SRS with a target priority; and
   after the determining the positioning signal based on the positioning information, the method further comprises:
   sending the aperiodic sounding reference signal (SRS) to a network device based on the positioning information.

13. The positioning method according to claim 1, wherein the measurement is performed only on a current bandwidth part.

14. A terminal, comprising a memory, a processor, and a computer program stored in the memory and capable of running on the processor, wherein when the computer program is executed by the processor, steps of a positioning method are implemented, wherein the method comprises:
   obtaining positioning information, wherein the positioning information comprises priority information related to a positioning signal, and measurement time information of the positioning signal; and
   determining the positioning signal based on the positioning information;
   wherein the determining the positioning signal based on the positioning information comprises:
   measuring a positioning reference signal (PRS) based on measurement time information in configuration information of the PRS and configuration information of a target priority of the PRS;
   wherein, the priority information related to the positioning signal comprises a priority relation between the positioning signal and another signal or between the positioning signal and data service;
   the method further comprises:
   dropping low-priority data, in a case that the positioning signal overlaps the low-priority data.

15. The terminal according to claim 14, wherein the measurement time information is configuration information of at least one measurement time window.

16. The terminal according to claim 15, wherein the configuration information of the at least one measurement time window further comprises start time information of the at least one measurement time window; and
   the start time is determined based on following:
   an offset relative to a system frame number or a slot number of a serving cell or base station.

17. A network device, comprising a memory, a processor, and a computer program stored in the memory and capable of running on the processor, wherein when the computer program is executed by the processor, steps of a positioning method are implemented, wherein the method comprises:
   determining positioning information, wherein the positioning information comprises priority information related to a positioning signal, and measurement time information of the positioning signal; and
   sending the positioning information to a terminal;
   wherein the positioning information is for the terminal to measure a PRS based on measurement time information in configuration information of the PRS and configuration information of a target priority of the PRS;
   wherein, the priority information related to the positioning signal comprises a priority relation between the positioning signal and another signal or between the positioning signal and data service;
   wherein the positioning information is for the terminal to drop low-priority data, in a case that the positioning signal overlapping with the low-priority data.

18. The network device according to claim 17, wherein the measurement time information is configuration information of at least one measurement time window.

19. The terminal according to claim 18, wherein the configuration information of the at least one measurement time window further comprises start time information of the at least one measurement time window; and
   the start time is determined based on following:
   an offset relative to a system frame number or a slot number of a serving cell or base station.

20. The network device according to claim 18, wherein the configuration information of the at least one measurement time window includes duration information of the at least one measurement time window.

* * * * *